United States Patent [19]

Barris

[11] Patent Number: 5,434,797
[45] Date of Patent: Jul. 18, 1995

[54] AUDIO COMMUNICATION SYSTEM FOR A COMPUTER NETWORK

[76] Inventor: Robert C. Barris, 297 Stonecliff, Irvine, Calif. 92715

[21] Appl. No.: 326,737

[22] Filed: Oct. 20, 1994

Related U.S. Application Data

[63] Continuation of Ser. No. 898,827, Jun. 15, 1992, abandoned.

[51] Int. Cl.[6] .............................................. G06F 19/00
[52] U.S. Cl. ................................................ 364/514 A
[58] Field of Search ................ 364/514, 284.3, 284.4; 370/89; 358/85; 340/712; 395/154; 348/15

[56] References Cited

U.S. PATENT DOCUMENTS

| | | | |
|---|---|---|---|
| 4,503,288 | 3/1985 | Kessler et al. | 370/89 |
| 4,604,686 | 8/1986 | Reiter et al. | 364/200 |
| 4,987,492 | 1/1991 | Stults et al. | 358/85 |
| 5,127,003 | 6/1992 | Doll, Jr. et al. | 370/89 |
| 5,148,154 | 9/1992 | MacKay et al. | 340/712 |
| 5,262,875 | 11/1993 | Mincer et al. | 358/335 |
| 5,269,006 | 12/1993 | Dohse | 364/284.4 |

FOREIGN PATENT DOCUMENTS

| | | | |
|---|---|---|---|
| 2642248 | 7/1990 | France | 364/514 |

OTHER PUBLICATIONS

Swinehart et al; "An Experimental Environment for Voice System Development"; Xerox 1987.
Ades et al.; "Voice Annotation and Editing in a Workstation Environment"; Xerox Corp 1986.
Ruiz; "Voice and Telephony Applications for the Office Workstations". IEEE 1985.
Terry et al; "Managing Stored Voice in the Etherphone System"; ACM 1987.
Ahuja et al; "Networking Requirements of the Rapport Multimedia Conferencing System", IEEE 1988.
Grief et al; "Data Sharing in Group Work"; Laboratory for Computer Science, MIT/LCS/TM-316, 1986.
Maxemchuk; "An Experimental Speech Storage and Editing System"; Bell System Tech J. vol. 59, No. 8, 1980.
Tannenbaum; "Computer Networks"; Prentice Hall 1981, pp. 292-295.

*Primary Examiner*—Ellis B. Ramirez
*Attorney, Agent, or Firm*—Knobbe, Martens, Olson & Bear

[57] ABSTRACT

A two-way audio communication system is designed to allow basic audio communication between two users on a common computer network. The audio communication system of the present invention is designed to work in the background of the computer, so the user can work on other software applications simultaneously. In a half-duplex embodiment (i.e., only one user can talk at a time), if at least two users try to talk at the same time, an arbitration scheme is employed to settle the dispute. The winner of the arbitration can send a message, and the loser's message is discarded. The communication system reduces the time delay between when a message is sent on one end, and received at the other. In addition, the system provides for high quality audio reproduction of the message on the other end by minimizing the number of audible gaps or other artifacts transmitted along with the message.

20 Claims, 14 Drawing Sheets

FIG. 4
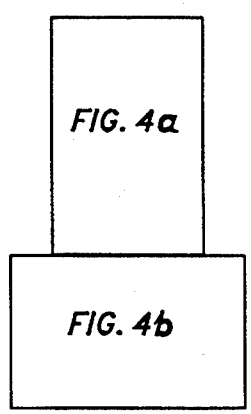
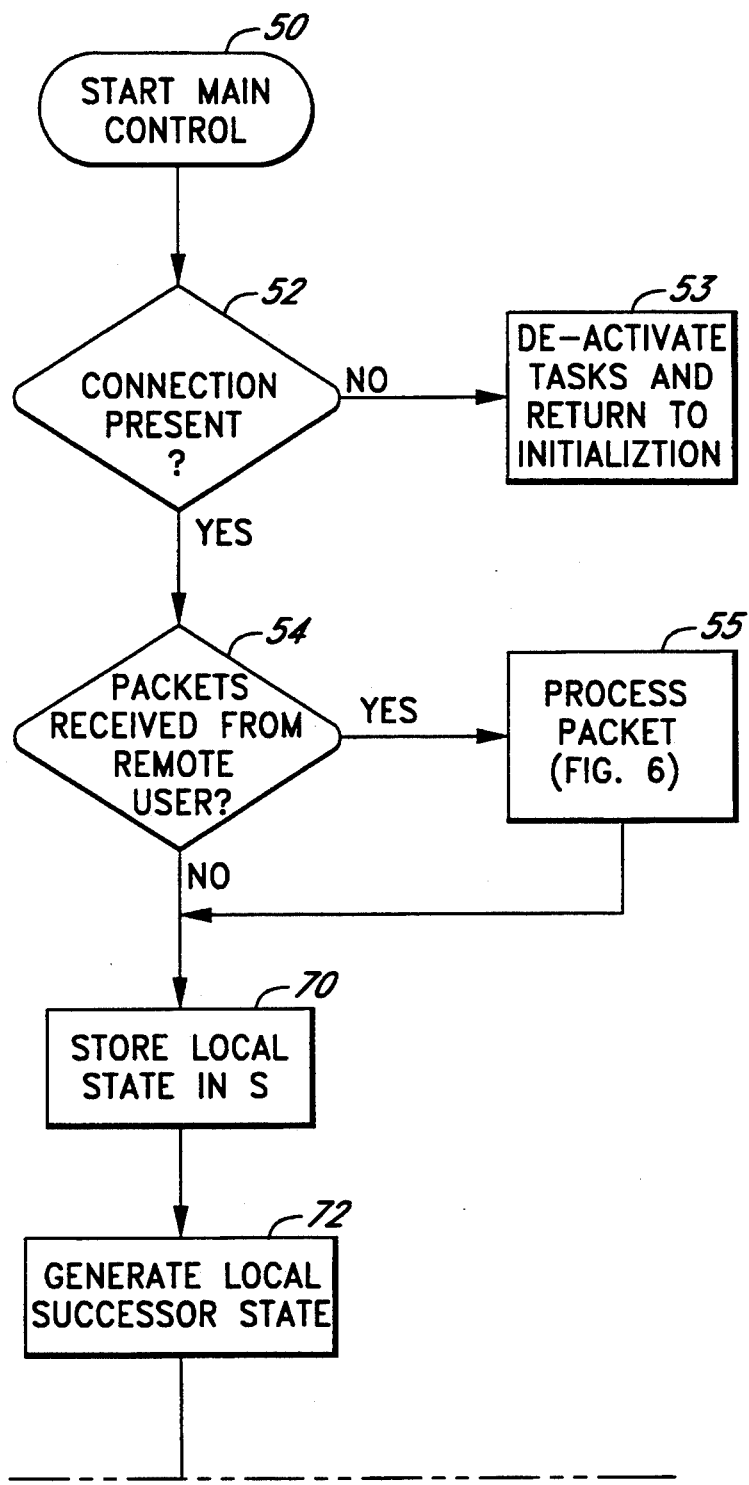
FIG. 4a

AUDIO COMMUNICATION SYSTEM FOR A COMPUTER NETWORK

This application is a continuation of application Ser. No. 07/898,827, filed Jun. 15, 1992, now abandoned.

FIELD OF THE INVENTION

The present invention relates to the field of audio communication, and more particularly to enabling audio communication between at least two users in a computer network.

BACKGROUND OF THE INVENTION

With the increased use of computer networks, many different media of communication between computer users are being explored. The most common of these media is a network messaging system such as electronic mail. These messaging systems eliminate some use of office memos, and encourage a paperless office by the more efficient use of the computer.

These computer messaging systems have several drawbacks when two network users try to actively "communicate" with each other. First, conventional messaging systems require the user to exit his current task and enter the messaging program. Once in the messaging program, the user typically types the message, and sends the message via the network to one or more users. To review a message, the recipient also exits his current task, and enters the messaging program. Moreover, the delay between sending the message and receiving a reply (the reply delay) associated with computer messaging systems does not easily facilitate a "conversation" between two parties.

Besides electronic mail, messaging systems exist which allow two or more users to connect and type messages to other users. However, typing messages through the computer lacks the personal nature of voice communication.

Currently, there is software available for the Macintosh ® which allows users on a network to speak with one another. However, each user must activate a button to transmit and also to end the transmission. The available software interposes a significant delay between when one user speaks and another user receives the voice communication. Moreover, the existing software requires the user to exit the current task in order to enter the voice communication application.

Therefore, a need exists for a simple voice communication system for use within a computer network. The voice communication system should enable real-time, gapless audio "conversations" to occur across the computer network.

SUMMARY OF THE INVENTION

The present invention comprises a two-way digital data audio communication system using digital data transmission over a shared channel to provide basic audio communication between two users on a common network. In the present embodiment, the communication between the two users is half-duplex (i.e., only one user can talk at a time). The half-duplex operation eliminates the need for echo cancellation and simplifies implementation for systems with audio hardware which is not capable of generating and receiving sound at the same time. Accordingly, in the present embodiment, if two users try to talk at the same time, the invention utilizes an arbitration scheme that does not require request-reply handshaking to occur between the two users' computers to determine which computer may continue transmissions of audio data.

The communication system of the present invention advantageously utilizes compression of digitized audio data. The invention further provides a significant reduction in the time between the transmission and reception of a message as compared to the prior art. In addition, the system provides high quality audio reproduction of the message on the receiving end by minimizing the number of audible gaps or other artifacts transmitted along with the message. The audio communication system of the present invention is designed to operate as a background application. Thus, the user can execute other software programs simultaneously, yet preserve the necessary bandwidth for gap-free communication.

In one embodiment, the system also comprises an audio data storage and retrieval feature. With this feature, one user may record audio data using the audio input hardware and store the audio data for later retrieval.

One aspect of the present invention involves an audio communication system for use in a computer station of a computer network, the computer station having a network interface, a microphone and a speaker. The communication system has an audio responsive input unit which accepts analog audio waveform signals from the microphone and digitizes the audio waveform signals. An audio output unit converts the digital audio waveform signals to analog audio waveform signals for audible output by the speaker. The system has a controller coupled to the audio responsive input unit, to the audio output unit, and to the network interface. The controller is configured to accept the digitized audio signals from the audio input unit and to provide the signals in audio data packets for transmission over the computer network. The controller is further configured to accept audio data packets from the network and to transfer the audio data packets to the audio output unit. The controller manages the operations of the audio communication system without substantially interfering with other application programs operating on the computer. In other words, the system operates as a background application.

In one embodiment, the audio responsive unit comprises a sound activated audio responsive unit activated by audio signals to begin processing the audio data.

In a further embodiment, the audio communication system comprises a data storage and retrieval system and the controller is configured to accept the digitized audio signals from the audio input unit and store the audio signals in the data storage and retrieval system. The controller can then retrieve (at a later time) the audio signals from the data storage and retrieval system and transmit them over the network to another station or transfer the audio signals to the audio output unit for playback.

Another aspect of the present invention involves a method of carrying out audio communication between users of at least two computer stations in a computer network. The method involves a number of steps. A connection is established between at least two computers on the network. Audio waveform input data is received at a first station and the audio waveform data is digitized to obtain digital audio waveform data. A first random arbitration value is generated and combined with the digital audio waveform data and a communication state of the first station to form a digital audio data packet. The digital audio data packet is transmitted over the network to a second of the at least two computers on the network. The audio data packet is received at the second computer station and converted into analog form to obtain analogy audio waveform data. The analog audio waveform data is transferred to a speaker to generate audible signals.

In one embodiment, the method further involves compressing the digital audio waveform data prior to combining the digital audio waveform data with the communication state and the random arbitration value, and expanding the digital audio data at the second computer station prior to converting the digital audio data from the packet to analog form.

Advantageously, the method of the present invention is carried out without substantially interfering with other application programs operating on the computers.

DETAILED DESCRIPTION OF THE PREFERRED EMBODIMENTS

The present invention comprises a two-way audio communication system within a computer network environment. Although the present invention can be used to transmit digital data over any shared channel, it is preferably used in a computer networking environment. Furthermore, although the present invention may be implemented over any type of network such as cabled, radio, cellular or other, the description which follows is for a conventional computer network connected via a cabling system, as is well known in the art. The present embodiment is also described for those Macintosh ® computers which include microphones and speakers. However, the invention could be applied in any computer system with appropriate audio input and audio output capabilities. The audio input and audio output hardware need not be internal to the computer, but may be external peripherals as well.

In the present embodiment, the communication between two parties using the system is half-duplex communication (i.e., only one station transmits at a time). Implementing the system as a half-duplex system eliminates many problems associated with feedback and echoing. In a half-duplex system, simpler audio hardware may be used, because the audio system does not require hardware to receive audio input and generate audio output simultaneously. Moreover, in a half-duplex system, it is not necessary to implement echo canceling and feedback canceling procedures. Simplifying the control of the system assists in maintaining the bandwidth necessary to provide real time communication between at least two computer users on the network.

In order to provide a half-duplex system, the system control prevents the simultaneous continuous transmission of audio data from at least two different stations. Therefore, the present invention provides an arbitration procedure in the event that two or more users transmit audio data at the same time. The arbitration procedure allows each computer to determine which computer will transmit audio data and which computer will receive the audio data, when both computers begin transmission of audio data at the same time, without a request-reply handshake.

System Architecture

Figure 1:
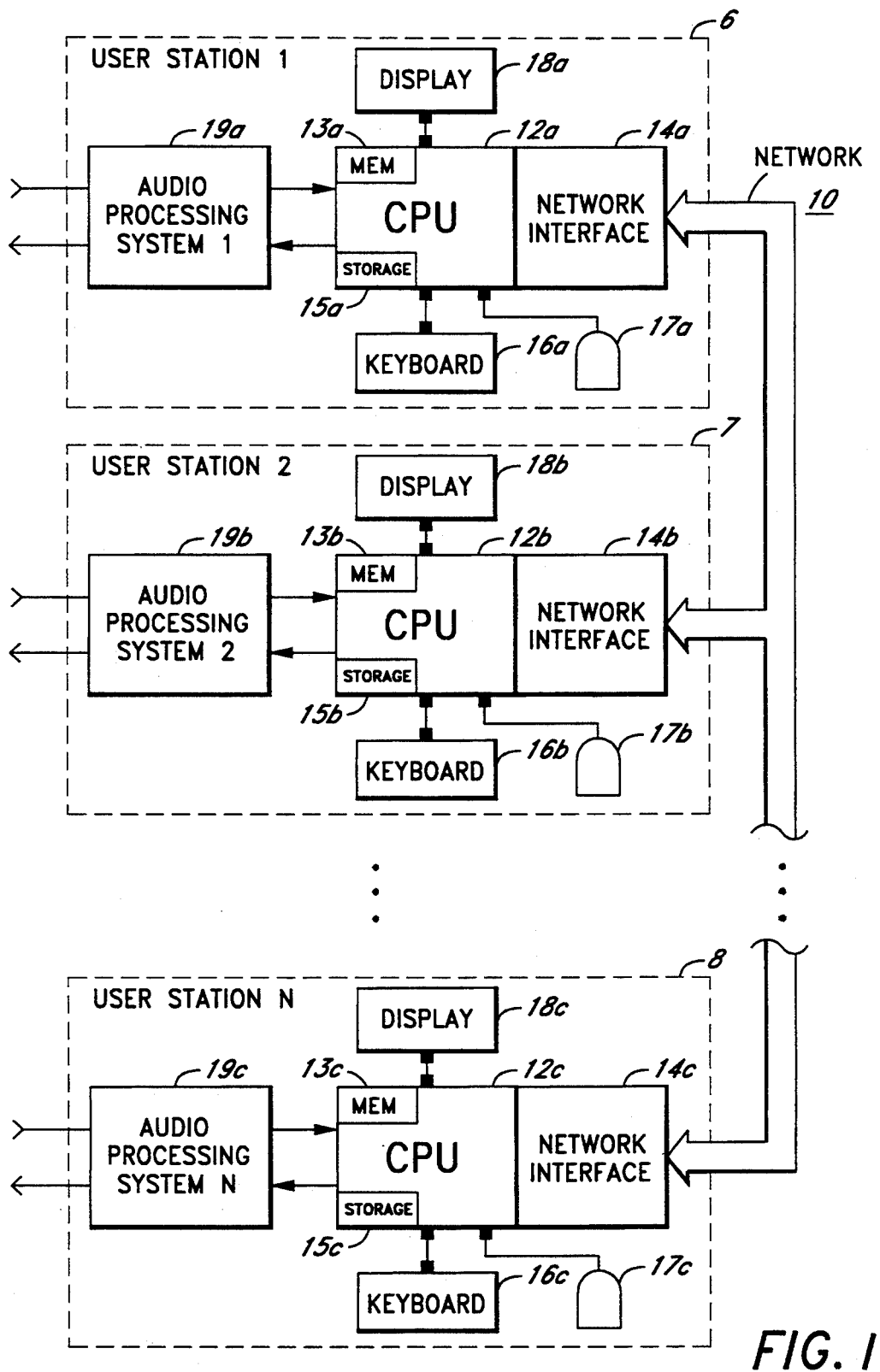
FIG. 1 is a schematic view illustrating the hardware utilized by the present invention.

The overall system block diagram of the present embodiment is illustrated in FIG. 1. The system comprises at least two network stations 6, 7, 8 connected to a common network 10. Each network station comprises, in general, a CPU 12a, 12b, 12c equipped with a network interface 14a, 14b, 14c, a keyboard 16a, 16b, 16c, a mouse 17a, 17b, 17c, a display 18a, 18b, 18c, and an audio processing system 19a, 19b and 19n. The CPU 12a, 12b, 12c, advantageously comprises system memory (MEM) 13a, 13b, 13c, a mass data storage and retrieval system 15a, 15b, 15c (e.g., a hard disk system), and other conventional circuitry, as is well known in the art. The audio processing system 19, as illustrated in further detail in FIG. 2, comprises and audio input system 20 and audio output system 22. The audio input system 20 further comprises audio input hardware 24, an audio input first-in, first-out buffer (FIFO) 34, a compressor 38 and a network transmission FIFO 36. The audio input hardware 24 further comprises a sound sensitive microphone 22, an analog/digital (A/D) converter 32 and some data buffers 37. The audio output system 22 further comprises a network reception FIFO 42, a digital data expander 40, an audio output FIFO 41, and audio output hardware 26. The audio output hardware 26 further comprises some data buffers 45, a digital/analog (D/A) converter 46 and an audio speaker 20. In the present embodiment, the system utilizes the microphone 22, the A/D converter 32, the digital compressor 38, the digital expander 40, the D/A converter 46, and the speaker 20, provided with many Macintosh ® computers. The audio input FIFO 34, the network transmission FIFO 36, the network reception FIFO 42, and the audio output FIFO 41, are advantageously configured in memory of each network station 6, 7, 8.

In the present embodiment, the network comprises a Macintosh ® based networking system. An appropriate network system for the present invention is advantageously capable of transmitting 2 Kbytes/second sustained between two stations. One typical Macintosh ® network transmits up to 20 Kbytes/second sustained, which provides the capability of more than two stations (e.g., up to 10 stations) simultaneously utilizing the system of the present invention to carry on communications. Of course, other networking systems and other hardware configurations may also be utilized according to the present invention. In one embodiment, if the network has sufficient bandwidth to allow more than two computer stations to be connected at the same time, the messaging system may comprise a conference feature allowing more than two computers to connect to facilitate an audio conference.

The User Interface

Advantageously, the voice communication system is available on every network user station having the appropriate hardware and software. In the present embodiment, to enable the system on a computer, the user selects an icon on the screen which corresponds to the voice communication system of the present invention. This initiates operation of the system. The system may then execute as a background program, allowing the user to execute other application programs actively. Each computer or user station is considered a local station, and the other user stations on the network 10 are considered remote users. Advantageously, the communication system may be initiated at computer start-up so that each user does not have to initiate operation before he can be contacted by another user.

Figure 14:
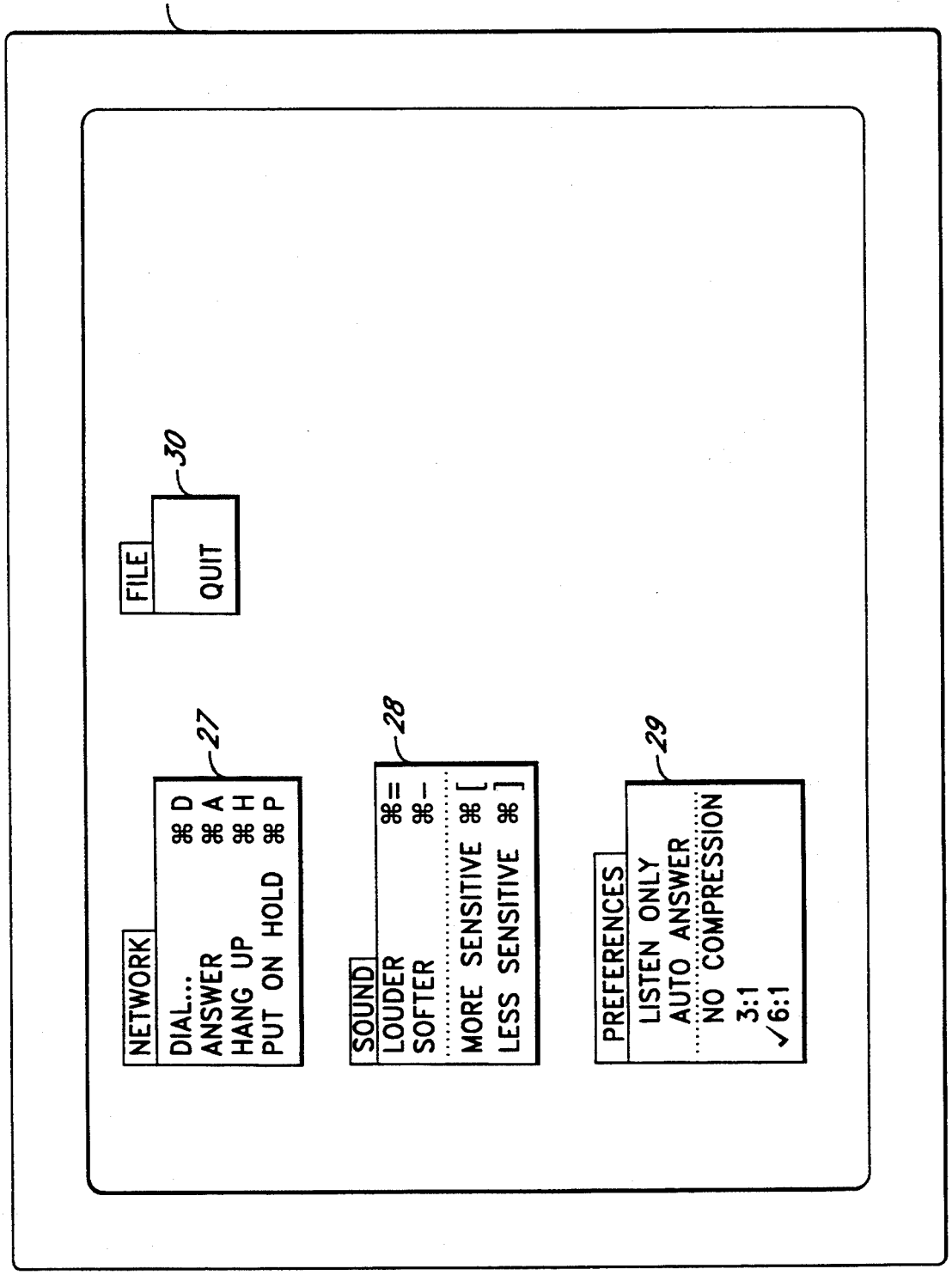
FIG. 14 illustrates exemplary menus for the present invention's user interface.

When the system software of the present invention is executing, a variety of menus as illustrated in FIG. 14 are available to the user on the computer display 18 including a File menu 30, a Network menu 27, a Sound menu 28, and a Preferences menu 29. However, these menus need not appear continually on the screen but may be activated by a key sequence, as a pull-down menu, or by selecting the messaging system application window as the displayed window on the screen, as is well known in the art for application programs which operate as background applications.

While the system is executing on any given station, it is not necessary for a connection to be present. To initiate a connection with another user, the Network menu is accessed with the appropriate key or menu, and a Dial function is selected. A window with a list of available users who are located at network computers (user stations) currently executing the messaging system appears on the screen. The initiator of the connection selects the name of the desired remote user connection. The messaging system then attempts to establish a connection with the selected remote user station. When the other user answers, conversation may begin. When one user attempts to contact another user, the user to be contacted will be alerted by a tone or by a message on the screen. To answer a connection request, the Preferences menu is accessed, and an Answer option is selected. The messaging system completes the network connection, and conversation may begin.

If one user desires to eliminate the necessity to answer each time another user tries to establish a connection, the Preferences menu may be accessed, and an Auto Answer option selected. If this option is selected, each time one user tries to connect to another user, the messaging system of the local computer station where the Auto Answer option was selected automatically answers, without requiring that the user manually take the steps necessary to answer the connection request.

The present invention also provides the capability of adjusting the sensitivity and sound levels of the computer system. This is provided by accessing the Sound menu. When two users initially establish a connection between their stations, the speaker volume and microphone (i.e., audio input hardware 24) sensitivity levels are automatically set to a medium level. The Sound menu provides several options to vary these parameters. The Louder option increases the speaker volume by a predetermined increment each time it is selected. The Softer option decreases the speaker volume by a predetermined increment each time it is selected. In one embodiment, the messaging system may display the current level of the speaker volume on the screen in a bar format when either the Louder or Softer options are selected.

A Put On Hold option disables the audio input hardware 24 and the audio output hardware 26 for the corresponding station. In other words, the Put On Hold option causes the system to ignore any audio data received by the microphone 22 and to ignore audio data transmitted from the remote station. If the Put On Hold option is selected again, while the system is "on hold," the hold function is disabled and the audio input and audio output for the station are once again enabled. The system may be configured to return the sensitivity and volume levels to the sensitivity and volume levels selected prior to selection of the Put On Hold option by the user. Alternatively, these levels may return to a medium level.

The Sensitivity option allows the user to adjust the sensitivity of the audio input hardware 24. This allows a user to adjust the sensitivity to prevent continuous background noise from the surroundings from continually transmitting to a connected remote user. In addition, the sensitivity option allows selection of the sensitivity to meet the typical volume level of the user's voice. A more sensitive selection increases the sensitivity of the audio input hardware 24, so that the system will still transmit soft speech. For instance, a More Sensitive option may be selected when the user is soft spoken. The Less Sensitive option decreases the sensitivity of audio input from the microphone 22 so that the background noises are not processed and transmitted to a remote connection, and only sounds above the desired sensitivity level are transmitted by the system. For instance, the Less Sensitive option may be selected if the background noises in the office are loud. The Less Sensitive option and the More Sensitive option will decrease and increase, respectively, the sensitivity by one predetermined increment each time they are selected. The sensitivity level is advantageously displayed on the screen in a bar format when either of these two options are selected.

In some instances, a user station may have audio output capabilities but no audio input hardware 24. A user may also not wish to utilize the audio input capabilities of the system. If a station does not have audio input hardware 24, but does have audio output hardware 26, the user may select a Listen Only option in the Preferences menu. This enables the audio output for the station so that the user may receive transmissions from another station.

In an alternative embodiment, if a user does not wish to utilize the audio capabilities of the system to speak to another user, or does not have audio input hardware 24 available on his computer system, that user may select a Message option (not shown) in the Network menu. Selecting the Message option causes a message box to appear on the screen, and the user can send a typewritten message using the keyboard 16 to input a message on his computer. A message box then appears on the recipient's screen with the typewritten message displayed. The recipient may either answer by speaking or may use the Message option on his computer to reply.

Once a communication link has been established between two user stations, the communication link remains active regardless of the execution of other programs on the computers. When one user wishes to communicate with the other linked user, the user only needs to begin talking, and the voice alone activates the transfer of audio data by the messaging system.

When a user wishes to terminate a connection, the user accesses the Network menu and selects a Hang Up option. This terminates the connection, but the messaging system remains operational (ready to institute a connection). While the messaging system remains operational, the user may establish communication with another user without exiting an executing application program by accessing the Network menu, as explained above, and selecting the Dial option.

To stop the messaging system's operation, (i.e., halt background execution of the system) the File menu is accessed, and a Quit option is selected. The Quit option halts program execution, and removes all messaging system menus from the computer screen. To restart the system software, the icon corresponding to the system software is re-selected as described above.

In one embodiment, the compression ratio utilized by the messaging system is selectable by the user. For instance, as depicted in FIG. 14, the Preferences menu 29 may include a selection for No Compression, 3:1 (i.e., a three to one compression ratio), and 6:1 (i.e., a six to one compression ratio). Increasing the compression ratio reduces the necessary network bandwidth required by the messaging system, but degrades the sound quality.

Once a communication link is established between two computers executing the messaging system on the network, the system operates in one of three modes: talking, listening, or idling. Talking indicates that the local computer is transmitting audio data to the remote user station; listening indicates that the user station is listening to messages from the remote user station; and idling means that the computer is waiting for audio input from the local user or waiting for a message from the remote user. The messaging system maintains six operative states which correspond to stages of these three modes: begin idling, idling, begin talking, talking, begin listening, and listening. Each of the possible software states is listed below followed by a corresponding binary value as assigned in the present embodiment. The binary value corresponding to the current state of the computer is stored in the CPU's memory as well as in a status field of audio data packets, as further explained below.

| State | Value | State | Value |
| --- | --- | --- | --- |
| "begin idling" | 000 | "idling" | 001 |
| "begin talking" | 010 | "talking" | 011 |
| "begin listening" | 100 | "listening" | 101 |

As illustrated in the table, the binary values of the "begin" states all end in a zero, and the binary values of all of the active states end in a one. Therefore, to advance the state of the computer from a "begin" state to an active state, the software performs a logical OR of the "begin" state binary value with a 1. The system does not necessarily cycle through the states in a sequential order; rather, the main control of the system determines the subsequent state of the system by checking a number of variables. If a station is in a "begin" state and no variables change during the next iteration of the main control task, the system changes the state to the corresponding active state (by performing the logical OR function described). The main control task of the system is responsible for the transition from one state to another, among many other functions.

In the present embodiment, the system moves audio data in data packets. A packet of data is a system defined data structure with a given storage capacity. The data packets of this system are defined to contain up to 100 bytes of digital data. Out of the available 100 bytes of data, at least two bytes of data are defined as fields in each data packet to hold status information. The remaining 98 bytes are reserved for digital audio data. In the present embodiment, the first byte of data in the data packet stores the state of the user station which sent the packet (i.e., the state of the station which generated the packet). The second byte of data in the data packet stores an arbitration value which is used to determine which computer will continue to transmit data if both computers attempt to transmit data at the same time.

Data Flow In The System

Figure 2:
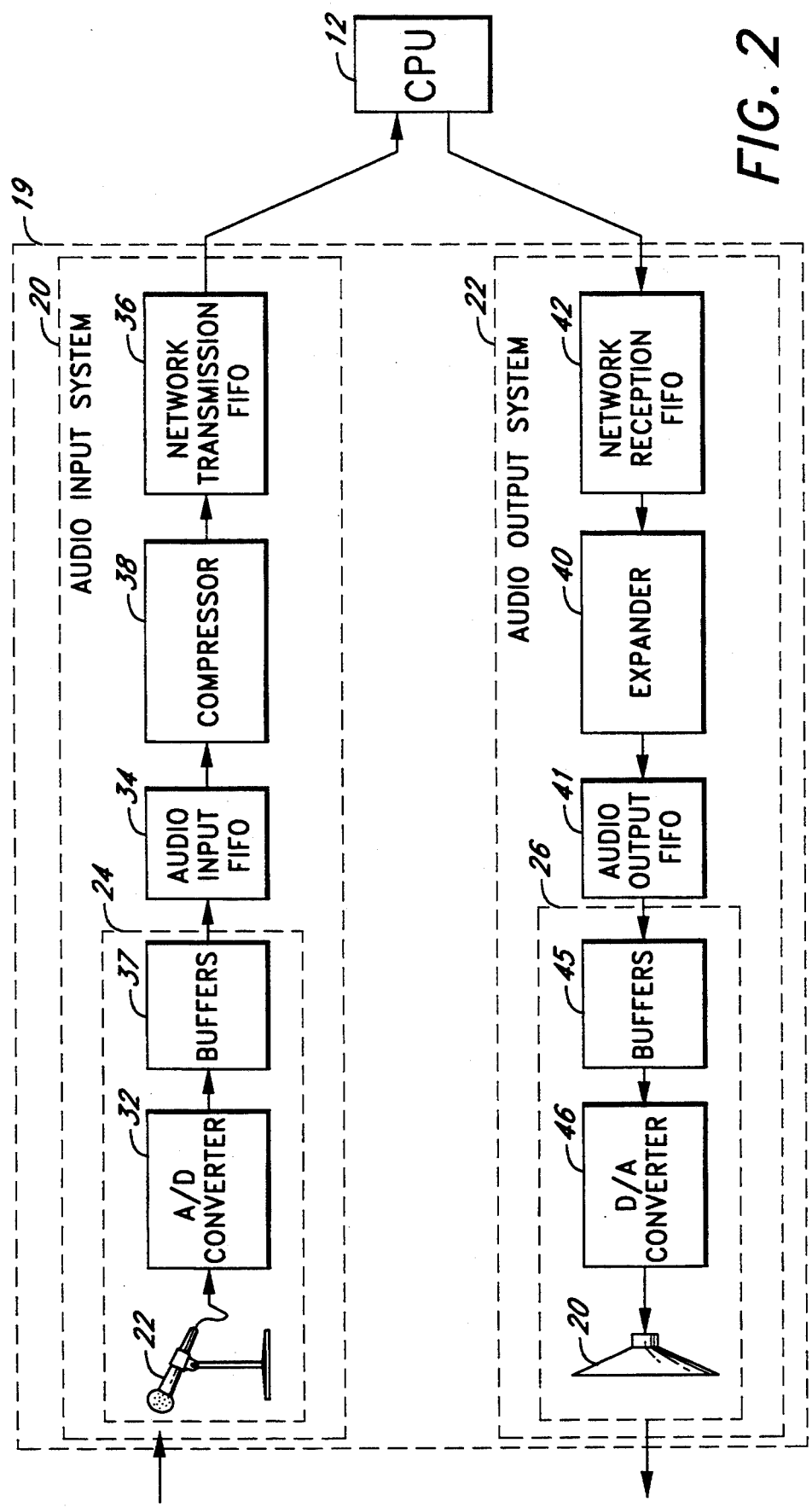
FIG. 2 is a diagram of the audio input and audio output systems and illustrates the data flow for the messaging system.

FIG. 2 schematically illustrates the flow of data in the messaging system. As illustrated in FIG. 1, each user has an audio processing system 19 which has audio input hardware 24 and audio output hardware 26. Therefore, each user may transmit or receive a message (packets of data) at any time. Audio input from a first user will be received by the microphone 22 for the station, and forwarded to the analog to digital (A/D) converter 32 to convert the analog microphone input data to digital information. Once the A/D converter 32 processes the data, the digital information is moved through buffers 37 to the audio input FIFO buffer 34. The digital data is then compressed using the compressor 38 to condense the data. In the present embodiment, the compressor 38 is provided with the Macintosh ® computer. However, it should be understood that many acceptable compression algorithms, implemented in hardware and/or software, are available which could be used to perform the compression performed by compressor 38.

Next the compressed information is combined in a packet with the state and arbitration value for the local computer. Each packet is then stored in the network transmission FIFO 36. The network transmission FIFO 36 and the audio input FIFO 34 are advantageously configured in memory of the CPU 12. In the present embodiment, each location of the network transmission FIFO 36 holds enough data for one packet (e.g., 100 bytes in the present invention).

After a packet is stored in the network transmission FIFO 36, the message system indicates to the network that information is available in the network transmission FIFO 36 for transmission on the network. When the network is ready to move a data packet, the network removes a data packet from the network transmission FIFO 36, places each packet onto the network 10, and delivers the packet to a remote user station.

Once the data is received by a the remote user station, it is sent through the audio output system 22 of the remote station where it is converted to audio waveforms to be played by the audio speaker 20. As explained above, the audio output system 22 comprises: a network reception FIFO 42, an expander 40, an audio output FIFO 41, Buffers 45, a digital to analog (D/A) converter 46, and an audio speaker 20. When the data packets are received by the audio output system 22, the data packet is stored in the network reception FIFO 42.

A control task of the present invention periodically checks the network reception FIFO 42. In the present embodiment, the messaging system accumulates at least three or four packets of data in the network reception FIFO 42 before processing the packets. If the system determines that three or more packets are present in the network reception FIFO 42, the system begins processing the packets by expanding the audio data in the packets with the expander 40 and transferring the expanded data into the audio output FIFO 41. The messaging system also checks certain status fields in the packet. The expanded audio data transferred to the audio output FIFO 41 is then transferred, via the buffers 45, to the D/A converter 46. The D/A converter 46 converts the digital information back to analog data to which the speaker 20 responds. The data is then transferred from the D/A converter 46, and played on the audio speaker 20 for the user to hear.

System Control

In general, the control of the messaging system of the present invention involves a number of tasks.

A main control task oversees the operation of each user station, deciding which state the user station is in at any given moment. The main control task also determines when to enable audio input and output, based on the local state of the user station.

An audio input task periodically transfers successive time-ordered packets of audio waveform data from the input hardware (i.e., the microphone 22, A/D converter 32 and buffers 37) to the audio input FIFO 34 for later analysis and possible transmission. The audio input task would be analogous to a common microphone in an analog system and can be enabled or disabled by the main control task.

An audio output task is the logical inverse of the audio input task and transfers successive time-ordered packets of audio waveform data from the audio output FIFO 41 to the audio output hardware 26 (i.e., the buffers 45, D/A converter 46 and the speaker 20). This task also can be enabled or disabled by the main control task.

A network reception task monitors the connection with the remote machine and transfers incoming packets to the network reception FIFO 42 for analysis and possible output if audio data from the remote machine is included in the packet.

A network transmission task monitors the network transmission FIFO 36 and transmits any packets contained in the transmission FIFO 36 to the remote machine via the established network communication link.

All packets transmitted contain a copy of the local state and an arbitration value of the station that generated the packet so the remote user station can maintain information with respect to the activity occurring on the local machine. Although these tasks are explained below in sequential order, these tasks may execute concurrently once activated.

Initialization

Figure 3:
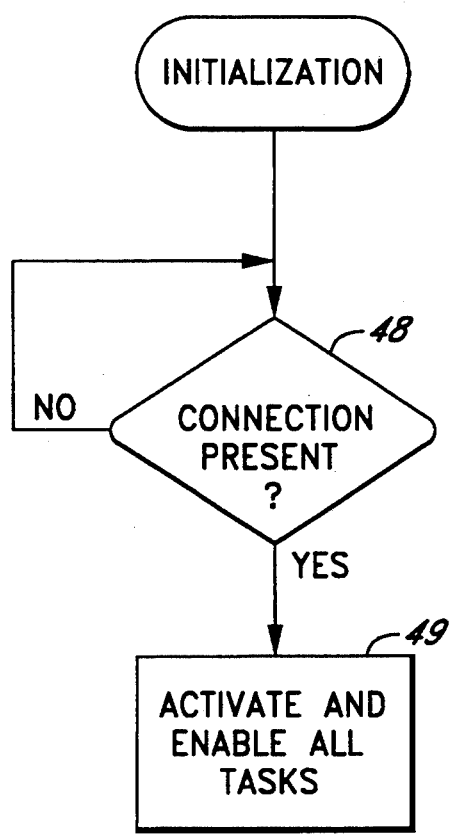
FIG. 3 is a flow chart illustrating the initialization operations of the audio communication system of the present invention.

Advantageously, the five principal tasks described above are not initiated until a connection is present between a local station and a remote station. Therefore, these tasks need not utilize computer time unless a connection is present. FIG. 3 illustrates the function of waiting until a connection is present until activating the communication tasks. In the flow chart of FIG. 3, a decision block 48 represents waiting for a connection between two stations. Once a connection is established, the messaging system activates and enables the main control task, the audio output task, the audio input task, the network transmission task and the network reception task, as represented in the action block 49.

Main Control Task

The main control task manages most of the functions of the system while a connection is present. The functions of the main control include, in general: determining the current state of the local station and the remote station if a connection is present, verifying that the local and remote stations are in compatible states, advancing the local station to a new state when warranted, and controlling the data flow between the two computers. Once the main control task is activated, it repeats continually until one of the two users terminates the connection.

An example of the typical functions performed by the main control task are illustrated in the flow charts of FIGS. 4–9. The main control task begins at start block 50 (FIG. 4) and immediately proceeds to a first decision block 52. At the decision block 52, the messaging system verifies that a connection still exists between the local station and a remote station (i.e., verifies that neither of the users have terminated the connection). If a connection is not present, the program de-activates the communication tasks and waits for a connection to be established in the initialization routine of FIG. 3, as represented in an action block 53. Once a connection is verified, the program determines if data packets have been received from the remote user at a decision block 54. If data packets have been received in the network reception FIFO 42, the program processes the data packets at an action block 55. This process packets routine of the main control task is illustrated in additional detail in FIG. 6.

At an action block 58 (FIG. 6), the remote state is read from the first status field of the newly received data packet and stored in a storage location (i.e., variable). The messaging system, at a decision block 60, then determines if the state of the remote system is "begin talking".

If the remote system is begin talking, the arbitration value, which is stored in the second status byte of the data packet, is stored in the local system memory at an action block 62. Next, at decision block 64, the system checks to see if the audio output task (FIG. 11) is enabled. In the present embodiment, enabling a task does not mean that the task necessarily begins execution, but that a flag is set indicating to the task to carry forth its operations on the data the task normally operates upon. Likewise, disabling a task does not mean that the task halts execution, but that a flat is set indicating to the task to ignore data that the task would normally operate upon. As explained, the audio output task controls the transmission of the digital data which has been received in a data packet from the remote computer to the audio output hardware 26 of the local computer, and will be described in further detail below. If the audio output task is enabled, control continues to a decision block 68. If the audio output task is not enabled, then the system resets and enables the audio output task at action block 66 and then proceeds to a decision block 68. Resetting the audio output task means that the task ignores any old data and processes only newly incoming audio data.

At the decision block 68, the system determines if the received data packet contains audio data in the packet.

Figure 4B:
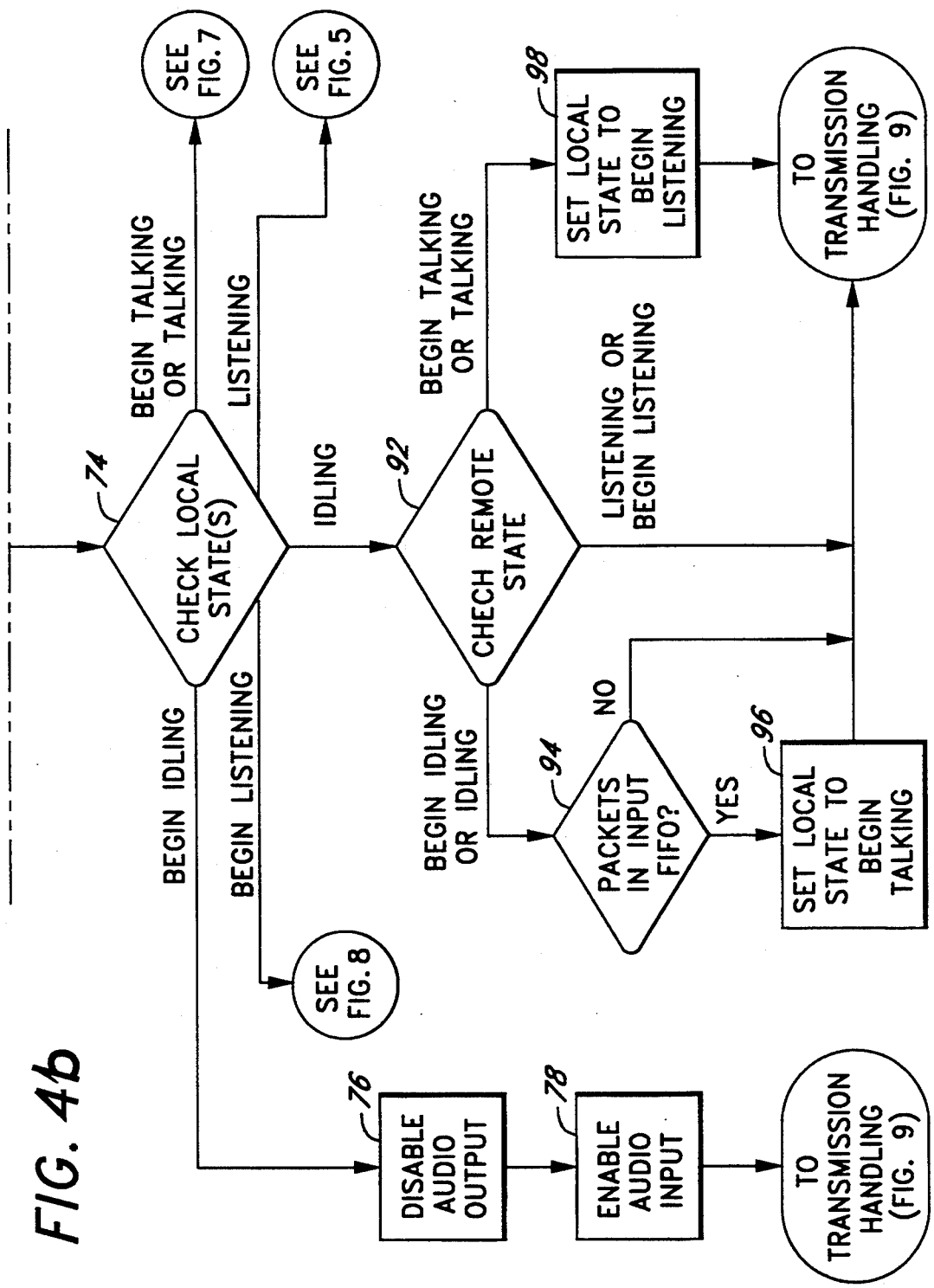
FIGS. 4–9 are flow charts illustrating the functions of the main control task for the present invention.

If the packet does not contain audio data, control proceeds to an action block 70 (FIG. 4). If the data packet does contain audio data, the audio data is expanded in the expander 40 and moved to the audio output FIFO 41 at an action block 69. The main control task then continues at the action block 70 (FIG. 4).

At the action block 70, the state of the local computer is saved in a location of the computer's memory, referred to as the variable "S" for further reference. At an action block 72, the next state of the local computer is determined by ORing the present state with a 1. This will change any "begin" states to the corresponding active state, but will not affect active states.

At a decision tree 74, the main control task executes different operations depending on the local computer state (S). Thus, at decision tree 74, the system makes a decision based on the state (S) of the local computer. If the local state (S) is "begin idling", the program advances to an action block 76 and disables the audio output task (of FIG. 11) of the local computer. Control then proceeds to an action block 78 where the system enables the audio input task (of FIG. 10) to receive input from the audio input hardware 24. The program then proceeds to the transmission handling operations illustrated in FIG. 9, as further described below.

Figure 8:
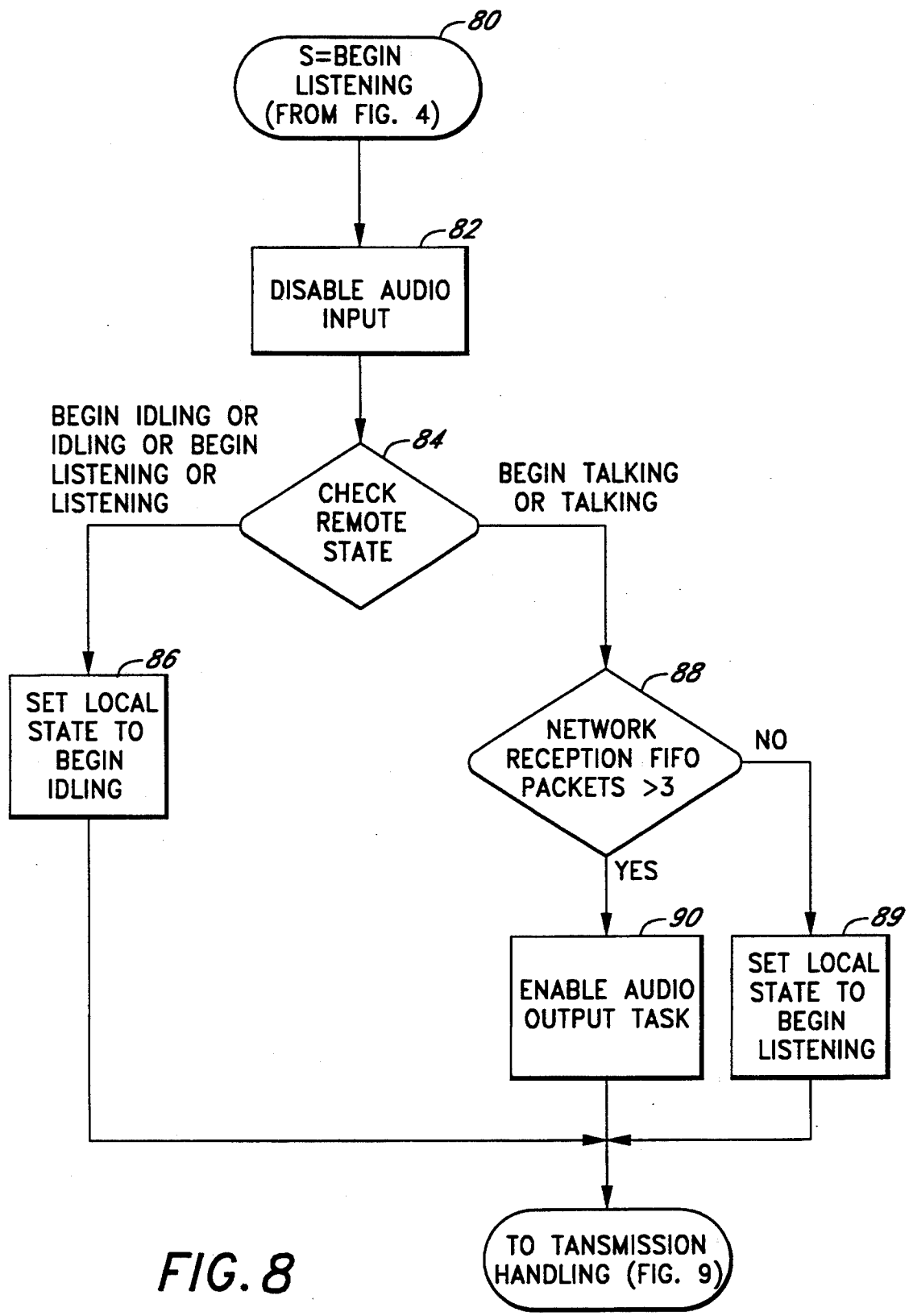

If the local state at a decision tree 74 is "begin listening", the program proceeds to the steps illustrated in FIG. 8, via the continuation block 80 (FIG. 8). At an action block 82, the program disables the audio input task (of FIG. 10) of the local computer to prevent an inadvertent attempt by the user to speak and listen at the same time.

At a decision block 84, the program checks the state of the remote station which was stored in the local computer's memory. If the state of the remote computer is "begin idling", "idling", "begin listening" or "listening", the program proceeds to action block 86. At the action block 86, the main control sets the state of the local computer to "begin idling". The program then proceeds to the transmission handling operations (FIG. 9) discussed below. If at decision block 84, the remote computer is in either the "begin talking" or "talking" state, then control proceeds to a decision block 88. At the decision block 88, the system determines if the network reception FIFO 42 contains three or more packets of data. If the number of packets in the network reception FIFO 42 is less than three, control advances to an action block 89. At the action block 89, the local state is set to "begin listening", and control proceeds to the transmission handling operations of FIG. 9. If the number of packets in the FIFO 42 is three or greater, as determined in the action block 88, then the system enables the audio output task illustrated in FIG. 11, discussed in greater detail below. Control then proceeds to the transmission handling operations of FIG. 9.

If at decision block 74 (FIG. 4), the local state is "idling", control proceeds to a decision block 92. At the decision block 92, the state of the remote computer (which was in the last packet received by the local computer from the remote computer) is checked. If the state of the remote computer is "begin listening" or "listening", the program proceeds directly to the transmission handling operations of FIG. 9. If the remote computer is in either the "begin idling" or "idling" states, control proceeds to a decision block 94. At the decision block 94, the system determines if there are data packets in the network transmission FIFO 36. If no packets are found in the network transmission FIFO 36, then the main control task proceeds to the transmission handling operations of FIG. 9. If the network transmission FIFO 36 contains data packets, control advances to an action block 96. At the action block 96, the main control task sets the local state to "begin talking", because the audio input hardware 24 of the local computer received audio input while it was "idling". After the local state is set to "begin talking", control proceeds to the transmission handling operations of FIG. 9.

If at decision block 92, the state of the remote computer is either "begin talking" or "talking", the program advances to an action block 98. At the action block 98, the main control task sets the state of the local computer to "begin listening", because the remote computer sent a message to the local computer while the local computer was "idling" (i.e. waiting for some form of input) as determined at the decision block 74. After the state of the local computer has been set at the action block 98, control proceeds to the transmission handling operations of FIG. 9.

Figure 5:
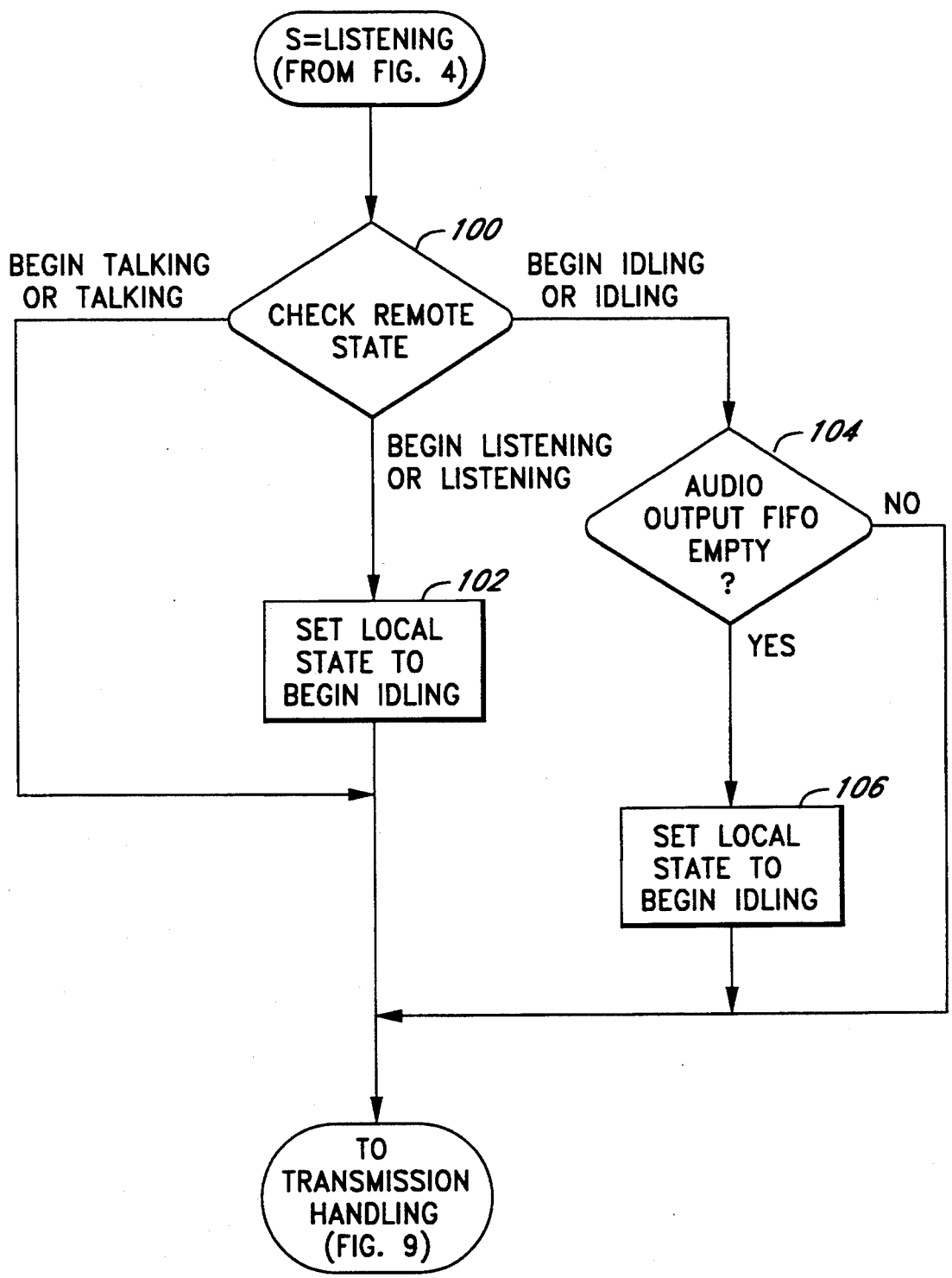
Figure 6:
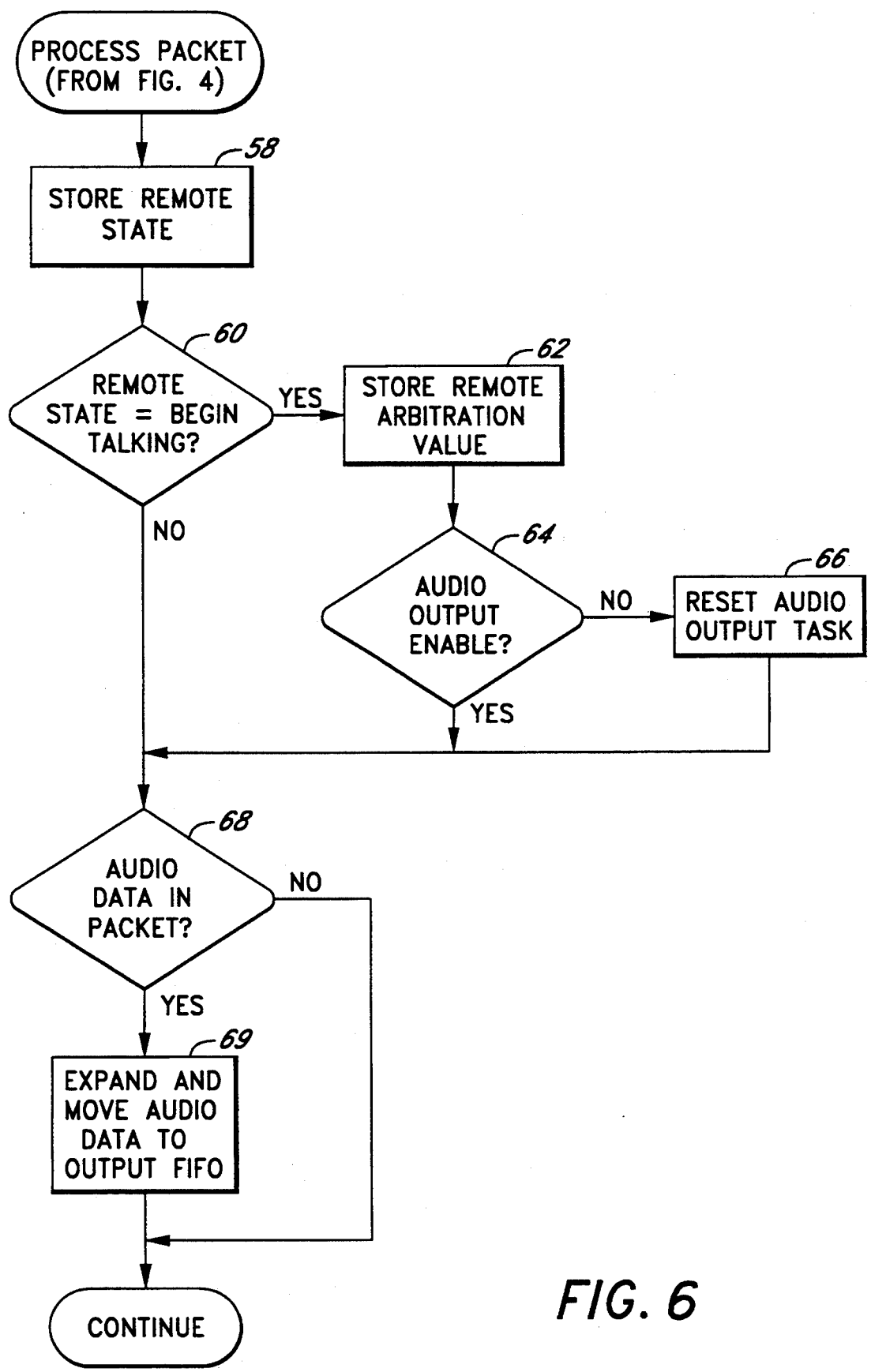

If at decision block 74, the state of the local computer is "listening", control proceeds to the continuation flow chart of FIG. 5. In a decision block 100, the state of the remote computer is checked. If the state of the remote computer is either "begin talking" or "talking", control proceeds to the transmission handling task of FIG. 9. If at the decision block 100, the status of the remote computer is either "begin listening" or "listening", control proceeds to an action block 102. At the action block 102, the state of the local computer is set to "begin idling", as both the local computer and the remote computer are waiting to receive a message. The main control task then proceeds to the transmission handling operations of FIG. 9.

Figure 9:
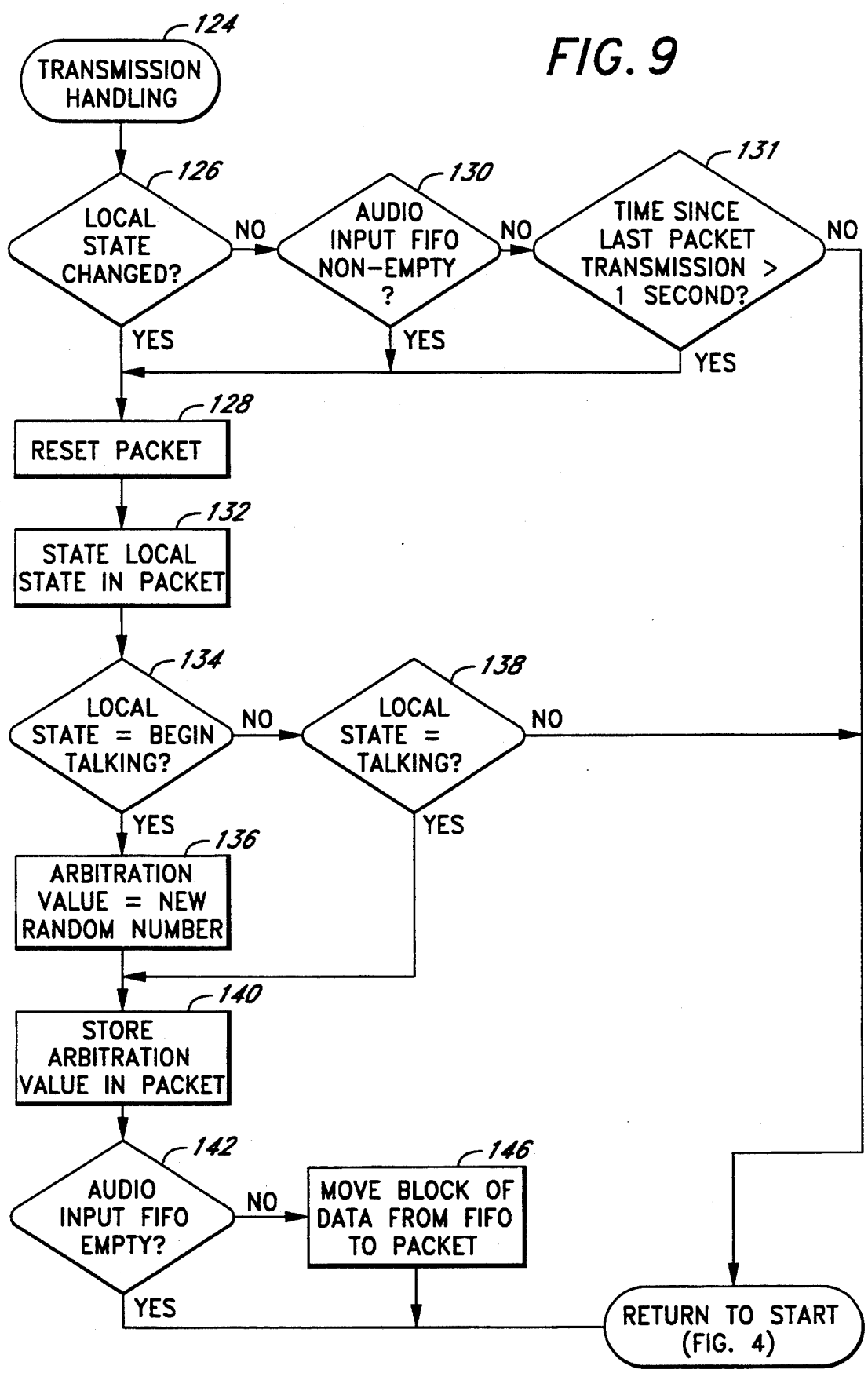

If at decision block 100 the state of the remote computer is either "begin idling" or "idling", control proceeds to a decision block 104. At the decision block 104, the system checks to see if the audio output FIFO 41 is empty. If there is still data in the audio output FIFO 41, the program proceeds to the transmission handling operations as illustrated in FIG. 9, in order to process the remaining data. If the audio output FIFO 41 is empty, the local computer has finished processing data received from the remote computer, and the program proceeds to an action block 106. At the action block 106, the state of the local computer is set to "begin idling", and control proceeds to the transmission handling operations of FIG. 9.

Figure 7:
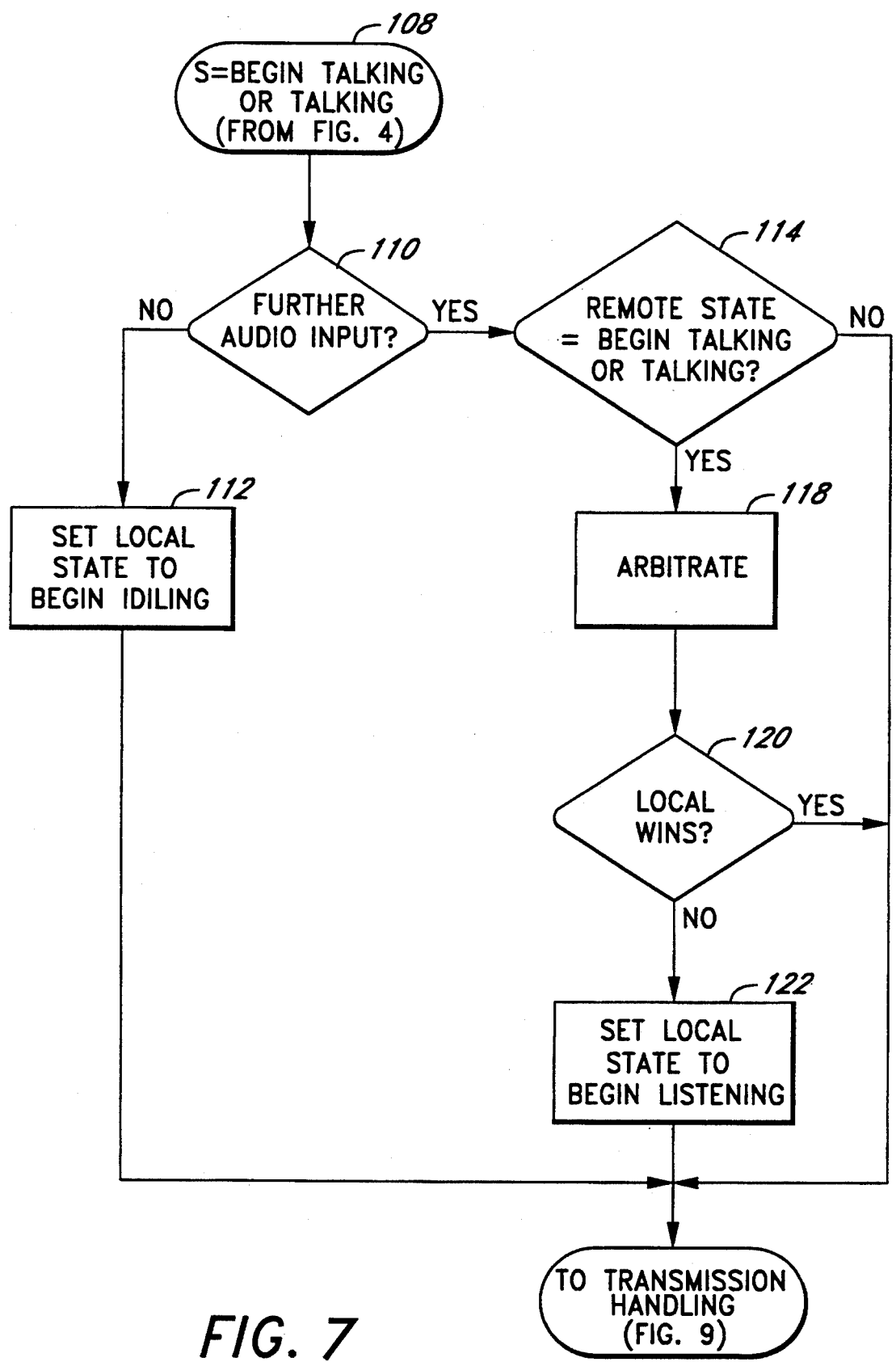

If at the action block 74, the state of the local computer is either "begin talking" or "talking", control advances to the steps illustrated in the continuation flow chart of FIG. 7, via a continuation block 108 (FIG. 7). At a decision block 110 (FIG. 7), the system determines if further data has been generated by the local audio input hardware 24. If no additional data has been generated, the main control task advances to an action block 112. At the action block 112, the local state is set to "begin idling", and the local main control task awaits either additional audio input through the microphone 22 or the receipt of a message from the remote computer. After setting the local state to "begin idling," the program proceeds to the transmission handling operations of FIG. 9.

Figure 10:
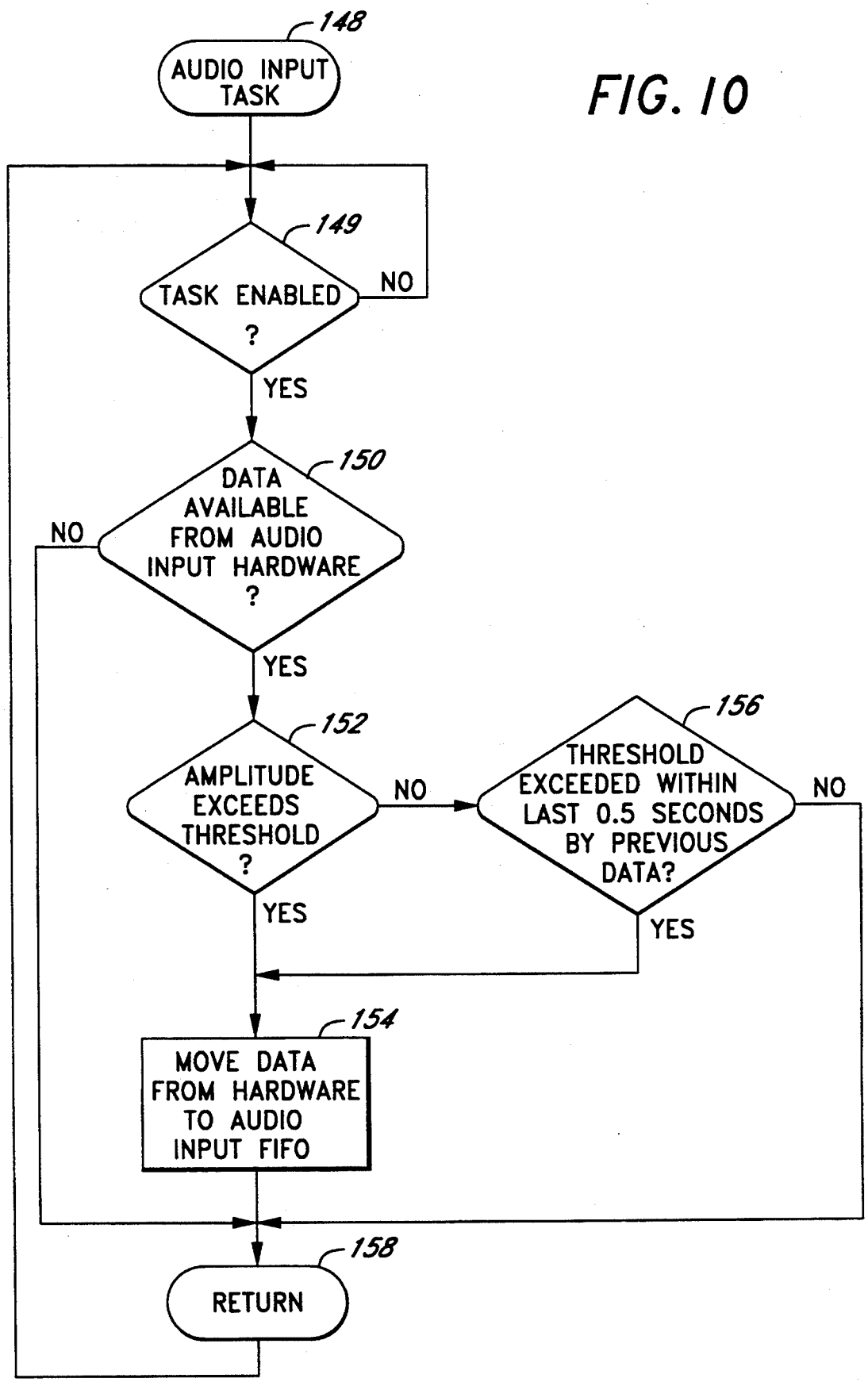
FIG. 10 is a flow chart which illustrates the audio input task of the present invention.

If at the decision block 110, further audio input is available from the audio input hardware 24, the program proceeds to a decision block 114. At the decision block 114, the main control task determines if the remote computer is in either the "begin talking" or the "talking" state. If the remote computer is not in either of these states, the local computer may continue to process the audio input from the audio input hardware 24. Control in the main control task then proceeds to the transmission handling task of FIG. 9. The audio input task, which manages audio input from the audio input hardware 24, is illustrated in FIG. 10 and will be described in greater detail below.

If at decision block 114 (FIG. 7), the state of the remote computer is either "begin talking" or "talking", control proceeds to an action block 118. At the action block 118 the system performs arbitration. Arbitration is performed because the decision blocks have indicated that both the local user station and the remote user station are in the "begin talking" or "talking" states. This indicates that both stations have initiated a transmission of audio data at the same time. In this case, it is advantageous to perform arbitration in the half-duplex system to determine which computer will continue the transmission. However, performing a message-reply handshake would interpose an additional delay into the system. Therefore, the arbitration performed in the system of the present invention does not require a message-reply handshake.

The arbitration entails the local computer comparing the arbitration value from the remote computer (which was stored when the last packet received the remote computer) to the arbitration value of the local computer (which was stored when the last packet transmitted from the local computer). These arbitration values are random numbers which are stored in each packet created for transmission to another computer. New random numbers are generated by a station whenever the station enters the begin talking state. If the local computer initiated the connection between the two users, then the random number for the local computer is an odd number; the remote random numbers will be generated as even numbers. If the remote computer initiated the connection, the random number for the local computer is an even number; and the remote random number generated will be an odd number. The random number from one machine is chosen to be even and the random number from the other machine is chosen to be odd to eliminate the chance of a tie when the two arbitration values are compared. Accordingly, in the action block 118, the arbitration number from the local computer is compared to the arbitration number from the remote computer. Control then proceeds to a decision block 120.

If at the decision block 120, the arbitration number of the local computer is greater than the arbitration number from the remote computer, control proceeds to an action block 116, the data from the remote station is discarded by the local station. The main control task then proceeds to the transmission handling operations of FIG. 9. If at the decision block 120, the arbitration number from the remote computer is greater than the arbitration number from the local computer, control proceeds to an action block 122. Because the local computer lost the arbitration, the message that the local computer sent to the remote computer is discarded by the remote station, and the local user will have to try to send a new message, after the remote user finishes talking. At the action block 122, the state of the local computer is set to "begin listening", to enable the continued receipt of packets from by the remote computer. After the action block 122, the main control task advances to the transmission handling operations of FIG. 9.

Each computer performs the same arbitration because each has received a packet from the other with the other's arbitration value. In that both the local and remote user stations will have the arbitration numbers which were stored in the last packet received and the last packet transmitted, the results of the arbitration will be the same for each user station. Therefore, each user station performs the same arbitration and determines the same answer to the arbitration without having to carry forth any further handshake or communication operation to determine which computer will proceed with further transmission. The user station that loses the arbitration enters the begin listening state, and the computer that wins the arbitration continues transmitting information, but does not process the packet received from the other user station that lost the arbitration. As long as the station that lost the arbitration remains in the listening state, it does not accept audio input from the user (because the audio input task will be disabled), but processes the audio data from the station that won the arbitration. Once the station that won the arbitration changes from the talking state back to the idling state and sends a packet to the station that lost the arbitration, the station that lost the arbitration (in the listening state) returns to the idling state and may again accept audio input from the user (because audio input will be enabled in the action block 78 (FIG. 4)).

Although the arbitration number is stored in each packet created, as will be further explained below, a new arbitration number is only generated when a station enters the "begin talking" state.

The transmission handling operations of FIG. 9 begin at a continuation block 124. At a decision block 126, the main control task determines if the local state has changed. If the local state has changed (since the last time through the transmission handling operations), control proceeds to an action block 128. If the local state has not changed, control proceeds to a decision block 130. At the decision block 130, the system determines if the audio input FIFO 34 contains any data. If the audio input FIFO 34 contains data, the main control task proceeds to the action block 128. If the audio input FIFO 34 does not contain data, control proceeds to a decision block 131. At the decision block 131, the system determines if the time elapsed since the last data packet was transmitted is greater than one second. If the time elapsed since transmission of the last data packet was more than one second, control advances to the action block 128. If the time elapsed since the transmission of the last data packet was less than one second, the main control returns to the start block 50 (FIG. 4).

The decision blocks 126, 130 and 131 essentially provide that a packet will be transmitted if the local station has changed states, the audio input FIFO 34 contains additional audio data or the time elapsed since the last packet transmission is greater than one second. With respect to the last packet transmission being greater than one second, the system of the present invention sends a packet at least once every second from the local user station to the connected remote user station. The packet may contain no audio data, and may send a packet containing only the arbitration value and the local state. The remote computer, executing in the same program, likewise sends at least one packet every second to the local computer. In this manner a local station monitors the state of a connected remote station and will determine if the remote station has terminated the connection because the local station will receive no packets from the remote system for more than one second.

At the action block 128, a new packet is prepared by configuring a new packet data structure. At an action block 132, the current local state of the computer is stored in the first status field of the new packet. At a decision block 134, the main control branches depending on the local state just stored in the packet. If the local computer is in the "begin talking" state, control advances to an action block 136. At the action block 136, the computer generates a new arbitration number (a random even or odd number). As explained, the arbitration number is used to settle a dispute with the remote computer, in the event that both stations try to send data (i.e., "talk", at the same time). As explained, the arbitration number is a random number that is generated by the local computer. The arbitration number is stored in each packet. The random number that is generated is stored as the current arbitration value, and control proceeds to an action block 140.

If at decision block 134 the local computer is not in the "begin talking" state, control advances to a decision block 138 where the main control task determines if the local computer is in the "talking" state. If at the decision block 138, it is determined that the computer is not in the "talking" state, then control returns to the start block 50 of (FIG. 4). If the local computer is in the "talking" state, control proceeds to an action block 140. At the action block 140, the computer stores the current arbitration value in the second status field of the data packet. In general, if the local state is talking, a new arbitration value is not generated and the previous arbitration value is stored in the packet. In other words, a new arbitration value is only generated each time the local computer enters the "begin talking" state. That arbitration value remains unchanged until the local station again enters the "begin talking" state.

At a decision block 142, the system determines if the audio input FIFO 34 is empty. If the audio input FIFO 34 is empty, the control proceeds to an action block 144. If the audio input FIFO 34 is not empty, control proceeds to an action block 146. At the action block 146, a block of audio data from the audio input FIFO 34 is compressed with the compressor 38 and stored in the audio storage portion of the data packet currently being created. The generated packet containing the local state, the local station arbitration value and the audio data, if available, is stored in the network transmission FIFO 36. The network transmission task (FIG. 12), which will be described in greater detail below, will initiate the transfer of the packet over the network. Control then proceeds to the start block 50 (FIG. 4). This cycle continues until at least one of the two users wishes to terminate the connection between the two computers.

The Audio Input Task

FIG. 10 illustrates the audio input task beginning at a start block 148. The audio input task is executed to transfer data from the audio input hardware 24 to the audio input FIFO 34. At a decision block 149 the audio input task determines if it is enabled (i.e., a flag indicates it is to process data). If it is not enabled, the audio input task does not process data. If the audio input task is enabled, control proceeds to a decision block 150, and the local computer determines if audio input data is available from the audio input hardware 24. If data is not available, control advances to a return block 158, and the audio input task repeats.

If audio data is available, control advances to a decision block 152. At the decision block 152, the software verifies that the amplitude of audio input that is received exceeds the minimum amplitude threshold set by the local user. If the threshold was exceeded, the control advances to an action block 154. If the threshold was not exceeded, control proceeds to a decision block 156. At the decision block 156, the system determines if the amplitude threshold was exceeded within the last 0.5 seconds by previous data. If the amplitude threshold was recently exceeded, control advances to the action block 154. If the threshold was not recently exceeded, the data is discarded and control proceeds to the return block 158 and the audio input task repeats. At the action block 154, the audio data from the audio input hardware 24 is transferred to the audio input FIFO 34 for processing. Finally, control proceeds to the subroutine return block 158, and the audio input task repeats.

The Audio Output Task

Figure 11:
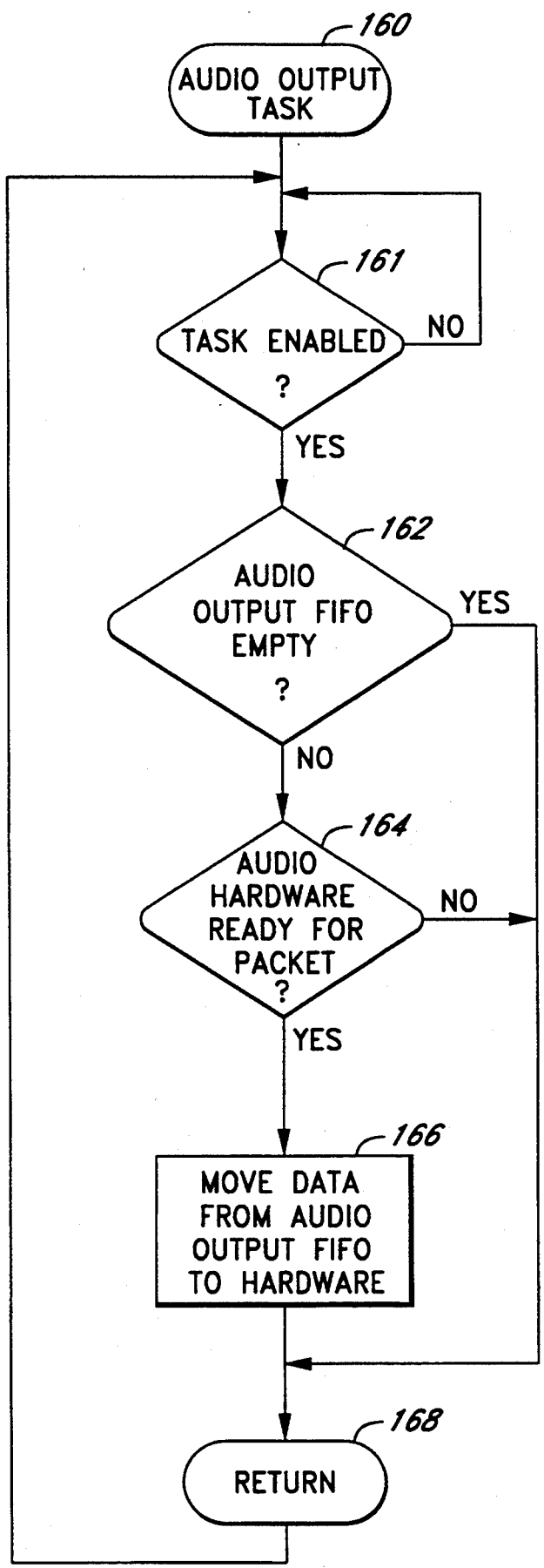
FIG. 11 is a flow chart which illustrates the audio output task of the present invention.

FIG. 11 illustrates that the audio output task transfers data from the audio output FIFO 41 to the audio output hardware 26 (the Buffers 45, the D/A converter 45 and the speaker 20). The audio output task begins at start block 160 and control proceeds to a decision block 161. At the decision block 161, the audio output task determines if it is enabled, (i.e., a flag is set indicating that the task is to process data). If the audio output task is not enabled, it does not process data. If the audio output task is enabled, control proceeds to a decision block 162, and the system determines if the audio output FIFO 41 is empty. If the audio output FIFO 41 is empty, control advances to a return block 168, the audio output task repeats. If the audio output FIFO 41 is not empty, control advances to a decision block 164. At the decision block 164, the system determines if the audio output hardware 26 is ready to receive data. If the audio output hardware is not ready for data, the system proceeds to the return block 168, and the audio output task repeats. If the audio hardware is ready for data, control advances to an action block 166. At the action block 166, data is transferred from the audio output FIFO 41 to the audio output hardware 26. Control than advances to the return block 168, the audio output task repeats.

The Network Transmission Task

Figures 12, 13:
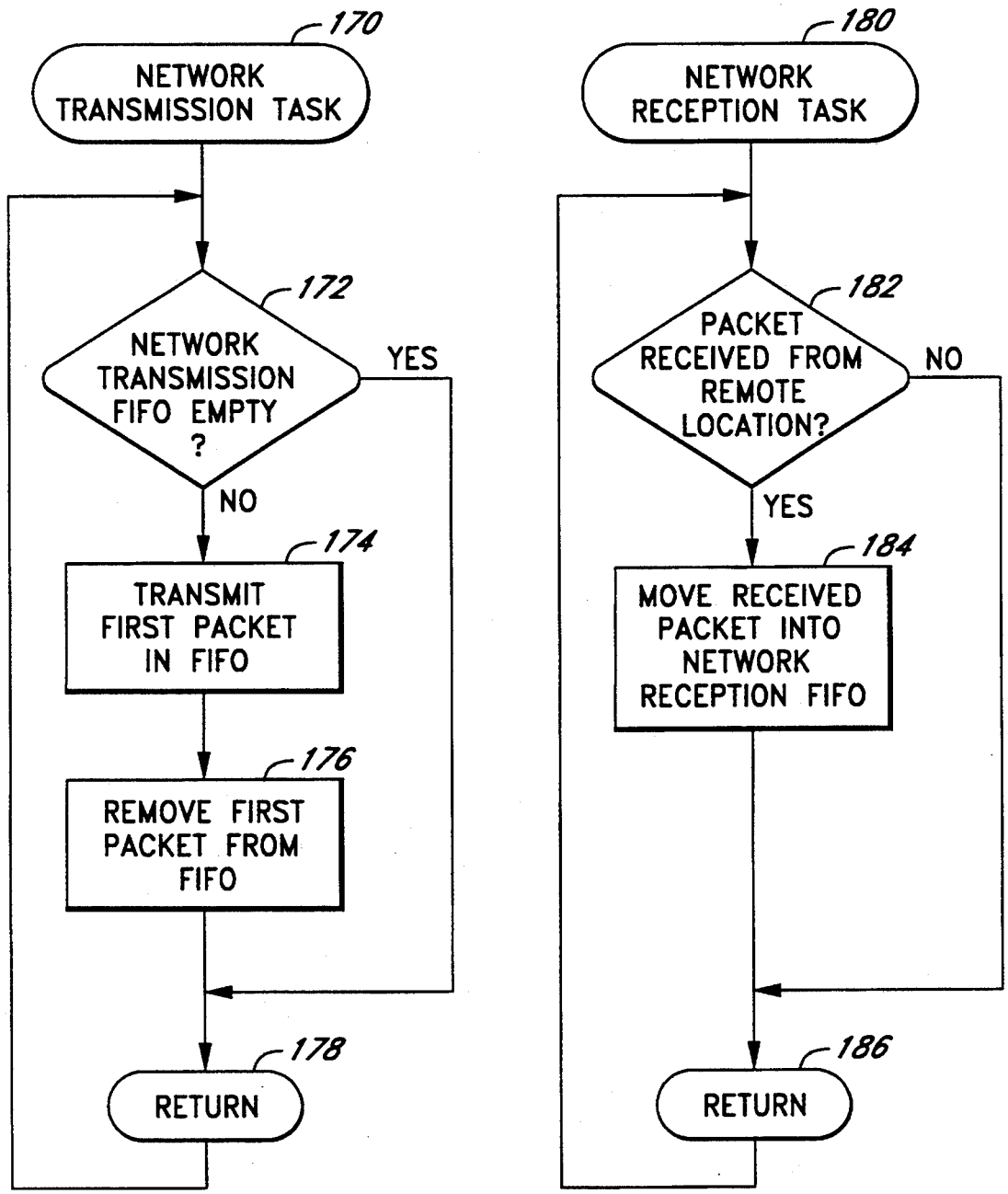
FIG. 12 is a flow chart which illustrates the network transmission task of the present invention.
FIG. 13 is a flow chart which illustrates the network reception task of the present invention.

FIG. 12 illustrates the network transmission task which enables data onto the network. The network transmission task begins at start block 170 and its function is to transfer data packets from the network transmission FIFO 36 to the network. From the start block 170, the network transmission task begins at decision block 172 and determines if the network transmission FIFO 36 is empty. If the network transmission FIFO 36 is empty, control proceeds to a return block 178, and the network transmission task repeats. If the network transmission FIFO 36 is not empty, control advances to an action block 174. At the action block 174, the first data packet in the network transmission FIFO 36 is enabled onto the network 10, and is sent to the remote computer. This occurs by providing an indication to the network of the location of the data, the amount of data to be transferred and the destination. The network then retrieves the data and transfers the data over the network 10 to the destination. The network then provides an indication to the local control program (the network transmission task) that the data has been transferred. The network protocol is defined by the network interface, as is well known in the art. Then, at an action block 176, the packet which was transmitted from the network transmission FIFO 36 is removed from the FIFO 36. The data need not necessarily be removed from the FIFO 36, but an indicator or flag can be set indicating that the location in the FIFO 36 which contains the transmitted packet is available for a new packet. Control then proceeds to the return block 178, and the network transmission task repeats.

The Network Reception Task

The network reception task is illustrated in FIG. 13 and begins at the start block 180. The network reception task receives data from the network and transfers the data packets to the network reception FIFO 42 where the packets are maintained for processing. At a decision block 182, the system determines if a packet of data was received from a remote location. In general, the network indicates to the local computer that it has information from a remote location. The local station then accepts this data and the messaging system stores the packet in the network reception FIFO 42. If a data packet was not received from the network, control proceeds to a return block 186, and the network reception task repeats. If a data packet was received, control advances to an action block 184. At the action block 184, the data packet is transferred from the network 10 to the network reception FIFO 42. Control then advances to the return block 186, and the network reception task repeats.

As explained above, the tasks described above advantageously execute as concurrently operating tasks in one embodiment. These tasks may also each be interrupt driven. For instance, in one embodiment, when the buffer 37 becomes full from audio data from the A/D converter 32, this signals an interrupt which activates the audio input task. An interrupt driven system has the advantage that it will operate effectively in a cooperative multitasking environment.

Although the present invention has been described as a half-duplex system, the present invention could be implemented as a full-duplex communication system. A full-duplex system is capable of processing audio input from the user and transmitting that data to a remote station simultaneously with receiving data from the remote station and processing the data for output. In a full-duplex system, the arbitration explained above becomes unnecessary in that both stations may transmit and receive at the same time. However, in a full-duplex system, the system further requires additional bandwidth and comprises feedback control to prevent audio data playing on the speaker of one station from being accepted as input data at the same station. Advantageously, the full duplex system would also operate as a background application.

The audio communication system of the present invention allows basic audio communication between at least two users on a common network. In addition, the audio communication system is designed to execute as a background application while the user works with other applications. The arbitration routine does not require handshaking to determine which user's message will be sent and which will be discarded if both users attempt to talk at the same time. This allows for a reduction in the time delay between when a message is sent from one station and received at another station, since there is no waiting for the receipt of a handshake before the data is sent. The system of the present invention sends the status information along with the data, and allows each computer to formulate an independent decision based on the status fields that are sent rather than using a handshaking architecture. Finally, the system provides for a high quality audio reproduction of the message by minimizing the number of audible gaps or other artifacts transmitted along with the message.

One embodiment of the present invention may also comprise an audio data storage and retrieval feature. In other words, the audio data input by one user at one user station need not necessarily be played immediately to another connected user, but could be recorded in memory of the computer or on other mass storage media such as a disk storage and retrieval system. This would allow for later retrieval of the audio data by the same user or another user. This feature has uses such as voice mail, dictation, and many others.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A computer station of a computer network, said computer station comprising:
   a computer station network interface;
   a microphone;
   a speaker; and
   an audio communication system, said audio communication system comprising:
   an audio responsive input unit which accepts analog audio waveform signals from the microphone and digitizes the audio waveform signals;
   an audio output unit which converts digital audio waveform signals to analog audio waveform signals for audible output by the speaker; and
   a computer station controller configured to execute application programs of said computer station, said computer station controller coupled to said audio responsive input unit, to said audio output unit, and to said computer station network interface, said computer station controller configured to accept the digitized audio signals from said audio responsive input unit and to provide the signals in audio data packets for transmission via said computer station network interface over the computer network, said computer station controller further configured to accept audio data packets from said network via said computer station network interface and to transfer said audio data packets to said audio output unit, said computer station controller also managing the operations of the audio communication system while other application programs are actively executing in the computer station controller.

2. The computer station of claim 1, wherein said audio responsive unit comprises a sound activated audio responsive unit activated by audio signals to begin processing the audio data.

3. The computer station of claim 1, wherein said audio responsive input unit further comprises an analog to digital convertor and a compressor, and wherein said audio output unit comprises a digital to analog convertor and an expander.

4. The computer station of claim 1, wherein said audio responsive input unit comprises a variable sensitivity audio responsive input unit which responds to signals from said controller to vary the sensitivity of the audio responsive unit to audio waveform signals from the microphone.

5. The computer station of claim 1, wherein said audio output unit comprises a variable volume level audio output unit which responds to signals from said controller to vary the volume level provided by the audio responsive unit to the speaker.

6. The computer station of claim 1, wherein said packets comprise a status field which contains data which reflects an operative communication state of the computer, an arbitration field which contains data which reflects an arbitration value, and an audio data field which contains compressed digital audio waveform data.

7. The computer station of claim 6, wherein the controller further comprises an arbitration module which determines without handshaking, which of at least two computers in the computer network will continue to transmit audio data when said at least two computers simultaneously begin sending audio data.

8. A network computer station on a computer network, said computer station comprising:
a computer station controller:
an audio output unit;
an audio input unit; and
an audio communication system, said audio communication system comprising:
a user interface having a plurality of user selections;
a computer station audio communication state data structure which contains a value indicative of one of a plurality of operative slates of the audio communication system;
a main control block operating in said computer station controller which controls the overall operation of the two-way audio communication system, said main control block responsive to said user selections, said main control block further monitoring the state contained in the computer station audio communication state data structure, said main control block configured to operate while other systems are actively executing on said network computer station;
a first network communication block which accepts audio data from said audio input hardware and indicates to the network that data is available for transmission; and
a second network communication control block which accepts audio data transferred over the network and provides the data to the audio output hardware of the user station.

9. The computer station of claim 8, further comprising:
an audio input control block which accepts audio data from said audio input hardware, compresses the data, combines the data with the operative state of the network computer and provides the data to the first network communication control block; and
an audio output control block which accepts audio data from said second network communication control block, wherein the data is compressed audio data, expands the compressed audio data and provides the data to the audio output hardware of the network computer.

10. The computer station of claim 8, wherein said user selections comprise a dial selection, an answer selection, a hang up selection, a louder selection, a softer selection, a more sensitive selection, a less sensitive selection, and an auto answer selection.

11. The computer station of claim 9, wherein each control block is an interrupt activated control block.

12. The computer station of claim 9, wherein each control block operates concurrently, and operates while application programs not associated with the communication system are actively executing in said network computer station.

13. The computer station of claim 9, wherein the audio input control block is activated upon detection of audio signal from the microphone.

14. The computer station of claim 9, wherein the compression occurs at a pre-selected ratio, said preselected ratio comprising a further user selection.

15. A method of carrying out audio communication between users of at least two computer stations in a computer network, said at least two computer stations having respective computer station controllers coupled to respective computer station network interfaces, said method comprising the steps of:
establishing a connection between the at least two computer stations on the network with a first of said at least two computer stations;
receiving audio waveform input data at the first computer station via the first computer station network interface;
digitizing said audio waveform data to obtain digital audio waveform data;
generating a first random arbitration data value;
in the first computer station controller, combining said digital audio waveform data with a communication state of the first station and with the random arbitration data value generated by said first station to form a digital audio data packet;
transmitting the digital audio data packet over the network via the first computer station network interface to a second of said at least two computers on the network;
receiving the audio data packet at said second computer station via the second computer station network interface;
converting the digital audio data from the packet to analog form to obtain analog audio waveform data; and
transferring the analog audio waveform data to a speaker to generate audible signals.

16. The method of claim 15, further comprising the steps of:
compressing said digital audio waveform data prior to combining said digital audio waveform data with the communication state and the random arbitration value; and
expanding the digital audio data at said second computer station prior to converting the digital audio data from said packet to analog form.

17. A computer station, said computer station comprising:
a computer station controller coupled to a computer station network interface;
a microphone;
a speaker; and an audio communication system, said audio communication system comprising:

an audio responsive input unit which accepts analog audio waveform signals from the microphone and digitizes the audio waveform signals;

an audio output unit which converts digital audio waveform signals to analog audio waveform signals for audible output by the speaker;

a data storage system; and a computer station controller in communication with said audio responsive input unit, with said audio output unit, and with said data storage system, said computer station controller configured to accept the digitized audio signals from said audio responsive input unit and to store the digitized audio signals in the data storage system, said computer station controller also managing the operations of the audio communication system while other application programs are actively executing on the computer station.

18. The computer station of claim 17, wherein the controller is further configured to retrieve the digitized audio signals from the data storage system and provide the digitized audio signals to the audio output unit.

19. The computer station of claim 17, wherein said audio responsive unit comprises a sound activated audio responsive unit activated by audio signals to begin processing the audio data.

20. The computer station of claim 17, wherein the computer is a network computer and has a network interface, said controller further in communication with the network interface and configured to provide the audio signals in audio data packets for transmission over the computer network, and further configured to accept audio data packets from said network and to transfer said audio data packets to said audio output unit.

* * * * *

UNITED STATES PATENT AND TRADEMARK OFFICE
CERTIFICATE OF CORRECTION

PATENT NO. : 5,434,797
DATED : July 18, 1995
INVENTOR(S) : Robert C. Barris

It is certified that error appears in the above-indentified patent and that said Letters Patent is hereby corrected as shown below:

Column 19, Line 38, "slates" should read "states".

Signed and Sealed this

Nineteenth Day of March, 1996

Attest:

BRUCE LEHMAN

Attesting Officer     Commissioner of Patents and Trademarks

US005434797C1

(12) EX PARTE REEXAMINATION CERTIFICATE (6411th)

United States Patent
Barris

(10) Number: US 5,434,797 C1
(45) Certificate Issued: Sep. 2, 2008

(54) AUDIO COMMUNICATION SYSTEM FOR A COMPUTER NETWORK

(75) Inventor: Robert C. Barris, Irvine, CA (US)

(73) Assignee: 2-Way Computing, Inc., San Diego, CA (US)

Reexamination Request:
No. 90/007,776, Oct. 25, 2005

Reexamination Certificate for:
Patent No.: 5,434,797
Issued: Jul. 18, 1995
Appl. No.: 08/326,737
Filed: Oct. 20, 1994

Certificate of Correction issued Mar. 19, 1996.

Related U.S. Application Data

(63) Continuation of application No. 07/898,827, filed on Jun. 15, 1992, now abandoned.

(51) Int. Cl.
*H04L 12/64* (2006.01)
*H04M 9/00* (2006.01)

(52) U.S. Cl. .................................. 709/204; 709/225
(58) Field of Classification Search .................. None
See application file for complete search history.

(56) References Cited

U.S. PATENT DOCUMENTS

| | | | |
|---|---|---|---|
| 3,958,226 A | 5/1976 | Kuroda et al. | |
| 4,028,667 A | 6/1977 | Breslau et al. | |
| 4,100,377 A | 7/1978 | Flanagan | |
| 4,119,797 A | * 10/1978 | Wollert | 381/110 |
| 4,181,974 A | 1/1980 | Lemay et al. | |
| 4,227,178 A | 10/1980 | Gergaud et al. | |
| 4,317,195 A | 2/1982 | Barberis et al. | |
| 4,387,424 A | 6/1983 | Frediani et al. | |
| 4,408,300 A | 10/1983 | Shima | |
| 4,456,956 A | 6/1984 | El-Gohary et al. | |
| 4,456,989 A | 6/1984 | Johnson et al. | |
| 4,479,195 A | 10/1984 | Herr et al. | |
| 4,489,387 A | 12/1984 | Lamb et al. | |
| 4,513,370 A | 4/1985 | Ziv et al. | |
| 4,525,779 A | 6/1985 | Davids et al. | |
| 4,531,184 A | 7/1985 | Wigan et al. | |
| 4,538,259 A | 8/1985 | Moore | |
| 4,571,736 A | 2/1986 | Agrawal et al. | |
| 4,581,735 A | * 4/1986 | Flamm et al. | 370/389 |
| 4,630,262 A | 12/1986 | Callens et al. | |
| 4,658,353 A | 4/1987 | Whittaker et al. | |
| 4,658,425 A | * 4/1987 | Julstrom | 381/81 |
| 4,710,917 A | 12/1987 | Tompkins et al. | |
| 4,727,589 A | 2/1988 | Hirose et al. | |
| 4,907,277 A | 3/1990 | Callens et al. | |
| 4,914,650 A | 4/1990 | Sciram | |

(Continued)

OTHER PUBLICATIONS

Friedman, Eluzor, "Packet Voice Communications Over PC-Based Local Area Networks", *IEEE Journal on Selected Areas in Communications*, vol. 7, No. 2, Feb. 1989.

(Continued)

*Primary Examiner*—Woo H. Choi

(57) ABSTRACT

A two-way audio communication system is designed to allow basic audio communication between two users on a common computer network. The audio communication system of the present invention is designed to work in the background of the computer, so the user can work on other software applications simultaneously. In a half-duplex embodiment (i.e., only one user can talk at a time), if at least two users try to talk at the same time, an arbitration scheme is employed to settle the dispute. The winner of the arbitration can send a message, and the loser's message is discarded. The communication system reduces the time delay between when a message is sent on one end, and received at the other. In addition, the system provides for high quality audio reproduction of the message on the other end by minimizing the number of audible gaps or other artifacts transmitted along with the message.

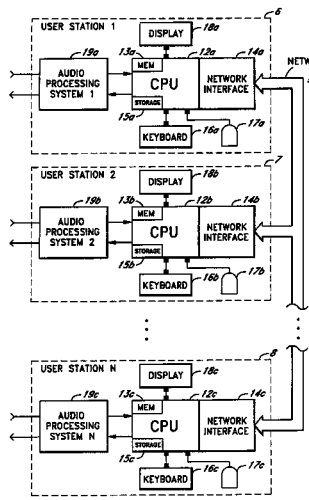

U.S. PATENT DOCUMENTS

| | | | | |
|---|---|---|---|---|
| 4,991,197 A | * | 2/1991 | Morris | 455/557 |
| 5,014,267 A | | 5/1991 | Tompkins et al. | |
| 5,016,159 A | | 5/1991 | Maruyama | |
| 5,130,985 A | | 7/1992 | Kondo et al. | |
| 5,142,623 A | | 8/1992 | Staab et al. | |
| 5,148,429 A | | 9/1992 | Kudo et al. | |
| 5,148,486 A | | 9/1992 | Kudoh | |
| 5,187,591 A | | 2/1993 | Guy et al. | |
| 5,191,649 A | | 3/1993 | Cadambi et al. | |
| 5,200,994 A | * | 4/1993 | Sasano et al. | 379/142.06 |
| 5,206,934 A | | 4/1993 | Naef, III | |
| 5,220,565 A | | 6/1993 | Wilson et al. | |
| 5,220,611 A | * | 6/1993 | Nakamura et al. | 704/278 |
| 5,247,671 A | * | 9/1993 | Adkins et al. | 718/103 |
| 5,355,453 A | * | 10/1994 | Row et al. | 709/219 |
| 5,359,598 A | * | 10/1994 | Steagall et al. | 370/359 |

OTHER PUBLICATIONS

Freuck et al., "An Approach to Introducing ISDN Basic–Access Terminal Adapters", *Telecommunications*; Feb. 1988; 22, 2; ABI/Inform Global, p. 74.

Eigen, Daryl J., Narrowband and Broadband ISDN CPE Directions, *IEEE Communications Magazine*, pp. 39–46, Apr. 1990.

J. O'Neill, et al., Secure Packet Voice Integration in a Generic Packet Switched Network—Part II—Protocol Architecture, Globecom '85 IEEE Global Telecommunications Conference, pp. 829–836, Dec. 1985, IEEE #85CH2190–7, 85–80023.

J. O'Neill, et al., "Secure Packet Voice Integration in a Generic Packet Switched Network—Part I—System Level Architecture", *Globecome '85 IEEE Global Telecommunications Conference*, pp. 822–828, Dec. 1985, IEEE #85CH2190–7, 85–80023.

Saito, et al., "Voice Packet Communication System for Private Networks", *IEEE Global Telecommunications Conference*, pp. 1874–1878, Nov. 1989.

Unemoto, et al., "Voice Synchronization Methods for Burst Rate Coded Voice", *IEEE Globecom*, pp. 1879–1884, 1989.

Leung, et al., "A Software Architecture for Workstations Supporting Multimedia Conferencing in Packet Switching Networks", *IEEE Journal on Selected Areas in Communiucations*, vol. 8, No. 3, Apr. 1990.

Sriram, et al., "Voice Packetization and Compression in Broadband ATM Networks", *IEEE Journal on Selected Areas in Communications*, vol. 9, No. 3, Apr. 1991.

Friedman, et al., "An Initial Design of a Distributed Packet Voice Communications Protocol", *IEEE Communications Society Conference*, pp. 412–416, Feb. 1987, IEEE Catalog No. 87$^{th}$0179–2.

Weiss, et al., "Packet Switched Voice Conferencing Across Interconnected Networks", $13^{th}$ *Conference on Local Computer Networks Conference*, pp. 114–124, Oct. 1988, IEEE Catalog No. 88CH2613–8.

Brunner, et al., "Performance Analysis of a Packet Voice Messaging System", *IEEE Infocom '90 Conference on Computer Communications*, pp. 938–946, Jun. 1990,IEEE #CH2826–5/90/0000/0938.

Weiss, et al., "A Comparative Analysis of Implementation Mechanisms for Packet Voice Conferencing", *IEEE Infocom '90 Conference on Computer Communications*, pp. 1062–1070, Jun. 1990, IEEE #CH2826–5/90/0000/1062.

Mehmet Ali, et al., "Analysis of Re–Assembly Buffer Requirements In a Packet Voice Network", *IEEE Infocom/86 Conference*, pp. 233–238, Apr. 1986, IEEE #CH2284–8/86/0000/0233.

Flanagan, et al., "A Digital Teleconferencing System with Integrated Modalities for Humn/Machine Communication; Humanet", *ICASSP 91*, pp. 3577–3579, May 1991,IEEE #CH2977–7/91/0000–3577.

Ramaswamy, Raju, "Design of a Secure Packet Voice Communication System in Wide Area Networks", *1990 International Carnahan Conference on Security Technology: Crime Countermeasures*, pp. 42–50, Oct. 1990, IEEE #CH2982–8/90/0000–0042.

Tanaka, et al., "Interrupted Voice Quality Evaluation and Adaptive Delay Control in a Voice Packet Communication System", *Electronics and Communications in Japan Part I: Communications*, vol. 74, No. 4, Apr. 1991, ISSN #8756–6621/91/0004–0046.

Magill, D.T., "Adaptive Speech Compression for Packet Communication Systems", *National Telecommunications Conference*, pp. 29D–1–29D–5, Nov. 1973, IEEE Catalog No. 73 CHO 805–2 NTC.

"ISDN: Integrated Services Digital Network", *Javvin Network Protocols Handbook, $2^{nd}$ Edition*, 2004–2005.

* cited by examiner

US 5,434,797 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 8 and 17 are determined to be patentable as amended.

Claims 2–5, 7, 9–16 and 18–20, dependent on an amended claim, are determined to be patentable.

New claims 21–32 are added and determined to be patentable.

1. A computer station of a computer network, said computer station comprising:
   a computer station network interface;
   a microphone;
   a speaker; and
   an audio communication system, said audio communication system comprising:
   an audio responsive input unit which accepts analog audio waveform signals from the microphone and digitizes the audio waveform signals;
   an audio output unit which converts digital audio waveform signals to analog audio waveform signals for audible output by the speaker; [and]
   a computer station controller configured to execute application programs of said computer station, said computer station controller coupled to said audio responsive input unit, to said audio output unit, and to said computer station network interface, said computer station controller configured to accept the digitized audio signals from said audio responsive input unit and to provide the signals in audio data packets for transmission via said computer station network interface over the computer network, said computer station controller further configured to accept audio data packets from said network via said computer station network interface and to transfer said audio data packets to said audio output unit, said computer station controller also managing the operations of the audio communication system while other application programs are actively executing in the computer station controller; *and*
   *a user interface that displays on a screen information relating to the other application programs that are actively executing and information to control the audio communication system.*

6. [The] *A* computer station of [claim 1] *a computer network, said computer station comprising:*
   *a computer station network interface;*
   *a microphone;*
   *a speaker; and*
   *an audio communication system, said audio communication system comprising:*
   *an audio responsive input unit which accepts analog audio waveform signals from the microphone and digitizes the audio waveform signals;*
   *an audio output unit which converts digital audio waveform signals to analog audio waveform signals for audible output by the speaker; and*
   *a computer station controller configured to execute application programs of said computer station, said computer station controller coupled to said audio responsive input unit, to said audio output unit, and to said computer station network interface, said computer station controller configured to accept the digitized audio signals from said audio responsive input unit and to provide the signals in audio data packets for transmission via said computer station network interface over the computer network, said computer station controller further configured to accept audio data packets from said network via said computer station network interface and to transfer said audio data packets to said audio output unit, said computer station controller also managing the operations of the audio communication system while other application programs are actively executing in the computer station controller, wherein said packets comprise a status field which contains data which reflects an operative communication state of the computer, an arbitration field which contains data which reflects an arbitration value, and an audio data field which contains compressed digital audio waveform data.*

8. A network computer station on a computer network, said computer station comprising:
   a computer station controller:
   an audio output unit;
   an audio input unit; and
   an audio communication system, said audio communication system comprising:
   a user interface having a plurality of user selections, *wherein the user interface comprises a display on a screen of a list of names available for selection for establishing an audio communication*;
   a computer station audio communication state data structure which contains a value indicative of one of a plurality of operative slates of the audio communication system;
   a main control block operating in said computer station controller which controls the overall operation of the two-way audio communication system, said main control block responsive to said user selections *from the displayed list of names*, said main control block further monitoring the state contained in the computer station audio communication state data structure, said main control block configured to operate while other systems are actively executing *on said computer station controller* on said network computer station;
   a first network communication block which accepts audio data from said audio input hardware and indicates to the network that data is available for transmission; and
   a second network communication control block which accepts audio data transferred over the network and provides the data to the audio output hardware of the user station.

17. A computer station, said computer station comprising:
   a computer station controller coupled to a computer station network interface;

a microphone;
a speaker; and
an audio communication system *that transmits and receives digitized audio data packets over a wireless network*, said audio communication system comprising:
an audio responsive input unit which accepts analog audio waveform signals from the microphone and digitizes the audio waveform signals;
an audio output unit which converts digital audio waveform signals to analog audio waveform signals for audible output by the speaker;
*a user interface that displays on a screen information relating to other application programs that are actively executing and information to control the audio communication system;*
a *mass* data storage system; and
a computer station controller in communication with said audio responsive input unit, with said audio output unit, and with said *mass* data storage system, said computer station controller configured to accept the digitized audio signals from said audio responsive input unit and to store the digitized audio signals in the *mass* data storage system, said computer station controller also managing the operations of the audio communication system while *the* other application programs are actively executing on the computer station *controller on the computer station*.

21. The computer station of claim 1, *further comprising a display that identifies a request to establish a connection from a user at a different network location*.

22. The computer station of claim 1, *further comprising a display that shows a message sent to the computer station from a user at a different network location*.

23. The computer station of claim 1, *further wherein said computer station controller is responsive to a hardware interrupt generated by said audio communication system*.

24. The computer station of claim 1, *further wherein the management operations of the audio communications system are initiated at start-up of the computer station*.

25. The computer station of claim 1, *further comprising a display, wherein the computer station controller causes the display to identify a request to establish a connection*.

26. The computer station of claim 1, *further wherein said packets comprise a status field which contains data which reflects an operative communications state of the computer station*.

27. The computer station of claim 1, *further wherein said packets comprise an arbitration field which contains data which reflects an arbitration value*.

28. The computer station of claim 1, *further wherein said computer station controller is responsive to a hardware interrupt generated by said audio responsive input unit*.

29. The computer station of claim 1, *further wherein said computer station controller uses hardware interrupts to operate in a multitasking environment*.

30. *A computer station of a cellular computer network, said computer station comprising:*
   *a display;*
   *a computer station network interface;*
   *a microphone;*
   *a speaker; and*
   *an audio communication system, said audio communication system comprising:*
   *an audio responsive unit which accepts analog audio waveform signals from the microphone and digitizes the audio waveform signals;*
   *an audio output unit which converts digital audio waveform signals to analog audio waveform signals for audible output by the speaker; and*
   *a computer station controller configured to execute application programs of said computer station, said computer station controller coupled to said audio responsive input unit, to said audio output unit, and to said computer station network interface, said computer station controller configured to accept the digitized audio signals from said audio responsive input unit and to provide the signals in audio data packets for transmission via said computer station network interface over the cellular computer network, said computer station controller further configured to accept audio data packets from said cellular computer network via said computer station network interface and to transfer said audio data packets to said audio output unit, said station network interface and to transfer said audio data packets to said audio output unit, said computer station controller also managing the operations of the audio communication system while other applications programs are actively executing in the computer station controller, wherein said display provides on a screen a user interface to control said audio communications system and said other application programs.*

31. *A computer station of a cellular computer network, said computer station comprising:*
   *a computer station network interface;*
   *a microphone;*
   *a speaker; and*
   *an audio communication system, said audio communication system comprising:*
   *an audio responsive input unit which accepts analog audio waveform signals from the microphone and digitizes the audio waveform signals;*
   *an audio output unit which converts digital audio waveform signals to analog audio waveform signals for audible output by the speaker; and*
   *a computer station controller configured to execute application programs of said computer station, said computer station controller coupled to said audio responsive input unit, to said audio output unit, and to said computer station network interface, said computer station controller configured to accept the digitized audio signals from said audio responsive input unit and to provide the signals in audio data packets for transmission via said computer station network interface over the cellular computer network, said computer station controller further configured to accept audio data packets from said cellular computer network via said computer station network interface and to transfer said audio data packets to said audio output unit, said computer station controller also managing the operations of the audio communication system while other application programs are actively executing in the computer station controller, further wherein a background application executing in the computer station controller manages the operations of the audio communication system, further wherein a user interface displays on a screen information that allows a user to manage the audio communication system and said other application programs.*

32. *A computer station of a computer network carrying packets, said computer station comprising:*
   *a computer station network interface;*
   *a microphone;* a speaker; and an audio communication system, said audio communication system comprising:

an audio responsive input unit which accepts analog audio waveform signals from the microphone and digitizes the audio waveform signals;

an audio output unit which converts digital audio waveform signals to analog audio waveform signals for audible output by the speaker;

a computer station controller configured to execute application programs of said computer station, said computer station controller coupled to said audio responsive input unit, to said audio output unit, and to said computer station network interface, said computer station controller configured to accept the digitized audio signals from said audio responsive input unit and to provide the signals in audio data packets for transmission via said computer station network interface over the computer network, said computer station controller further configured to accept audio data packets from said network via said computer station network interface and to transfer said audio data packets to said audio output unit, said computer station controller also managing the operations of the audio communication system while other application programs are actively executing in the computer station controller; and a user interface that displays on a screen information to control the audio communication system and said other application programs.

\* \* \* \* \*